US009802672B1

(12) United States Patent
Hermansen et al.

(10) Patent No.: US 9,802,672 B1
(45) Date of Patent: Oct. 31, 2017

(54) BICYCLE PEDAL ADJUSTABLY CONFIGURED FOR USE WITH MULTIPLE SHOE CLEATS

(71) Applicants: Frank Hermansen, Corona Del Mar, CA (US); Carl Winefordner, Laguna Beach, CA (US)

(72) Inventors: Frank Hermansen, Corona Del Mar, CA (US); Carl Winefordner, Laguna Beach, CA (US)

(*) Notice: Subject to any disclaimer, the term of this patent is extended or adjusted under 35 U.S.C. 154(b) by 0 days.

(21) Appl. No.: 15/098,088

(22) Filed: Apr. 13, 2016

(51) Int. Cl.
*B62M 3/08* (2006.01)

(52) U.S. Cl.
CPC .................... *B62M 3/086* (2013.01)

(58) Field of Classification Search
CPC ................ B62M 3/08; B62M 3/086
See application file for complete search history.

(56) References Cited

U.S. PATENT DOCUMENTS

| 6,035,743 A | 3/2000 | Gapinski et al. | |
| 6,877,399 B1 | 4/2005 | Swift | |
| 7,856,904 B2 * | 12/2010 | Lin | B62M 3/086 74/594.4 |
| 9,090,309 B2 | 7/2015 | Swift | |
| 2005/0252337 A1 * | 11/2005 | Chen | B62M 3/086 74/594.6 |

FOREIGN PATENT DOCUMENTS

| DE | 3832067 A1 * | 3/1990 | ............ B62M 3/086 |
| EP | 2428440 A1 * | 3/2012 | ............ B62M 3/086 |
| FR | 2499928 A2 * | 8/1982 | ............ B62M 3/086 |

* cited by examiner

*Primary Examiner* — Thomas C Diaz
(74) *Attorney, Agent, or Firm* — Stetina, Brunda, Garred and Brucker

(57) ABSTRACT

A bicycle pedal adapted for use with a plurality of different shoe cleats each having a respective cleat configuration. The bicycle pedal includes a front hook adapted to be engageable with a first portion of a shoe cleat, a cleat contact surface coupled to the front hook and adapted to be engageable with a second portion of the shoe cleat, and a rear hook coupled to the cleat contact surface and adapted to be engageable with a third portion of the shoe cleat. The front hook, cleat contact surface, and rear hook define an engagement configuration complimentary to the cleat configuration and are configured such that the engagement configuration is selectively adjustable to conform to the cleat configuration.

13 Claims, 23 Drawing Sheets

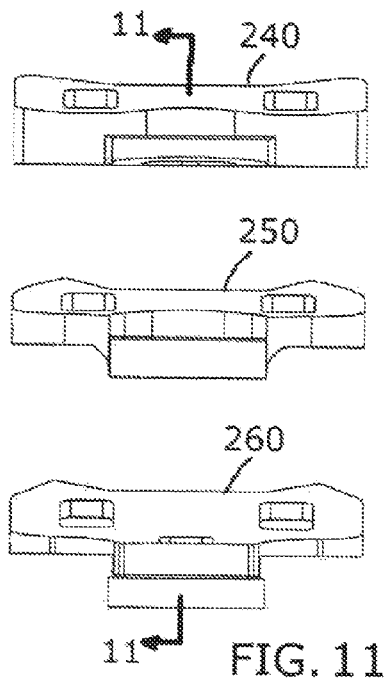
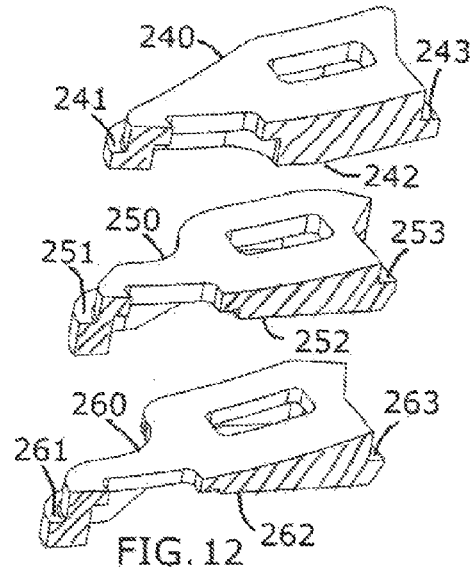
FIG. 11
FIG. 12
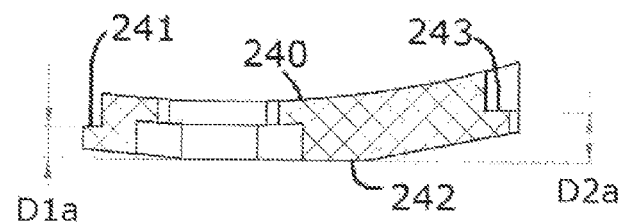
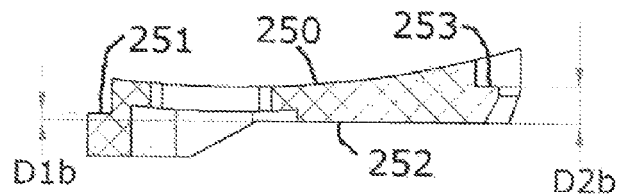
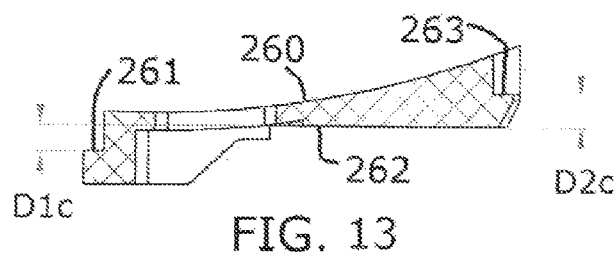
FIG. 13

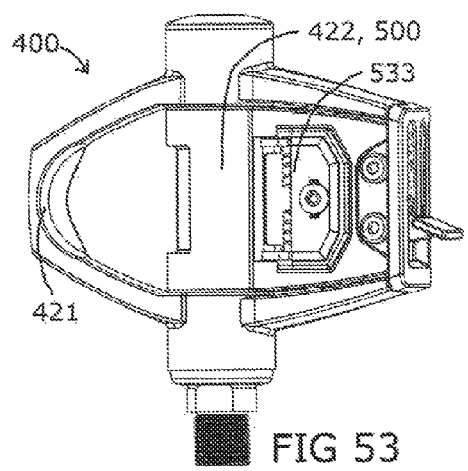
FIG 53
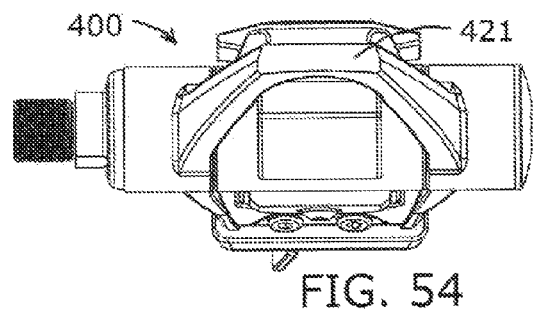
FIG. 54
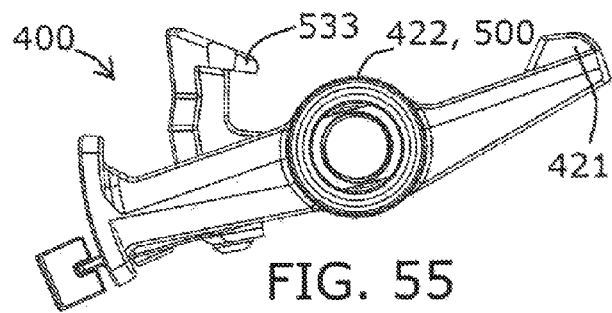
FIG. 55
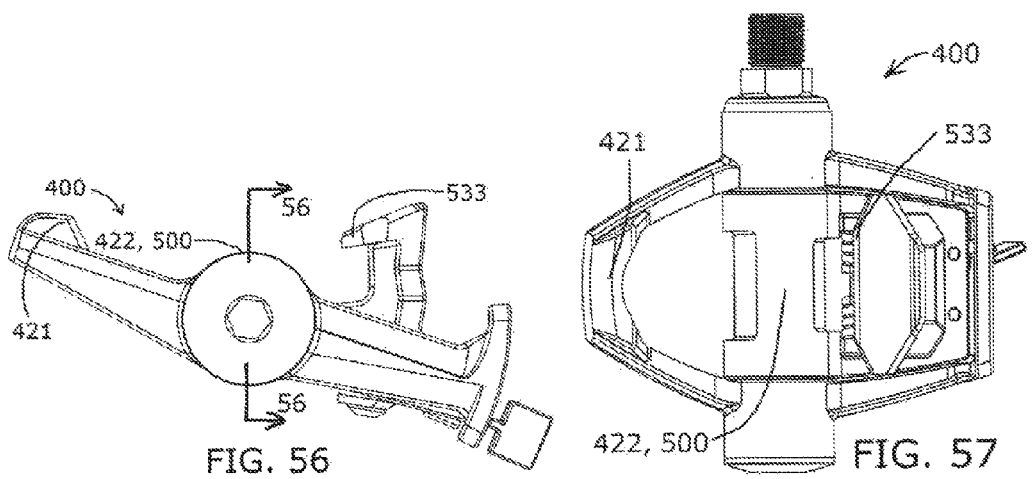
FIG. 56
FIG. 57

BICYCLE PEDAL ADJUSTABLY CONFIGURED FOR USE WITH MULTIPLE SHOE CLEATS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates to generally to bicycle pedals and in particular, to bicycle pedals specifically configured and adapted to accommodate a variety of bicycle shoe cleats, particularly for spin bikes (e.g., exercise bicycles).

2. Description of the Related Art

The continuing development of modern bicycles has resulted today in bikes being available to the general public with a wide variety of pedal designs. Early designs of bicycle pedals consisted of a flat pedal shape with a toe frame that fitted most cyclist's shoes, and included a strap called a toe clip or other connecting means that fixed or fastened the toes of the cyclist's shoes to the pedals. Cycling shoes were typically of a running shoe design and were not specifically designed for cycling.

In modern bicycle pedal designs this arrangement has been superseded by more precise mechanisms that lock the pedal onto special cleats which are fastened to the base of the cyclist's shoes. These new designs are commonly referred to as "clip-less" pedal/cleat designs because they replace the original toe clips. Using these new designs, the cyclist mounts the bicycle, places his shoe cleat onto the pedal and the pedal/cleat combination snaps or locks together creating a stable connection between the cyclist's feet and the bicycle pedal.

Various designs of pedal/cleat combinations are presently in use, which either lock rigidly together or allow various degrees of freedom of rotational motion between the pedal and the cleat, depending on the design. Manufacturers of pedals today typically produce pedal designs that require the use of special shoe cleats that lock onto or into their pedals only. This ensures to the manufacturer that the cyclist buys their particular combined pedal/cleat products. Generally, there are two types of cycling shoes: road and mountain. Mountain shoes typically have tread for ease of walking and a small slot with two female fasteners for attaching the small cleat. Conventional road shoes have no tread, and have a larger 3-hole pattern for attaching a larger cleat. In general, mountain shoes are easier to walk on, and road shoes are lighter and more stable.

Thus, modern cyclists require a particular design of matching shoe cleat to be worn on their cycling shoes in order to fit onto the pedals on their bicycles. Due to the better performance and ease of entry and exit of these new pedal/cleat designs, this is now the generally accepted standard in the case of the cyclist's own bicycle. Individual cyclists fit their preferred pedals onto their bicycles and fit the appropriate cleats onto their cycling shoes.

In recent years, there has been increasing interest and use of stationary exercise bicycles and many of the companies that manufacture road bicycles or other exercise equipment have also developed a line of stationary exercise bikes to meet this new demand. However, when these same pedal/cleat combinations developed initially for road bicycles are also used on the stationary cycling machines (or "spin-bikes" as they are commonly known) which are available in gyms or sports clubs, the cyclist is forced to use the appropriate cleat on his bicycle shoes.

This causes problems, as most cyclists prefer to use a particular brand and design of pedal/cleat combination on their road bicycles, and yet many cyclists have no choice but to purchase a new set of cycling shoes and install cleats that match the gym's spin bike pedals. Alternatively, cyclists may choose to bring their own pedals to the gym or exercise club and exchange the pedals on the stationary bike with their own pedals so they can use their own shoes and cleats to exercise. This practice is becoming less and less acceptable to gym instructors who do not want different riders to be changing pedals on their exercise bikes.

Manufacturers of spin bikes generally ensure that their own designs of pedal/cleat combinations are interchangeable. However, there is no interest on the part of these manufacturers to make their pedal/cleat designs compatible with any of their competitor's designs. This has created a serious inconvenience and difficulty in the use of spin bikes, which are used by a wide variety of cyclists and non-cyclists who are clients of a gym or exercise clubs. The clients of the gym or club wish to use their own particular brand of pedal/cleats and the gym can only offer a very limited selection.

Presently, the vast majority of road clipless pedals use one of three different cleats, typically known as Shimano Road™, Look Delta™, and Look Keo™. These three different road cleats vary enough in size and shape that they are not interchangeable, yet they are used in approximately equal numbers, each having about 25% of the world market. Two sided spin bike pedals are typically made for a Delta™ cleat on the road side and an SPD™ mountain bike cleat on the other. About 20 years ago, the majority of road bike pedals used the Delta™ cleat, but that percentage has consistently declined to the point where there is no road cleat that constitutes the majority of pedals sold anymore. Therefore, by dedicating the road side to any one of the three most popular cleats, about 75% of all road users will not fit that pedal, which is a big problem in spin classes for both riders and gym operators. State of the art cleat adapters are cumbersome to install and remove, sometimes get stuck on the rider's shoe and inadvertently twist out of the pedal, have an overly high profile when installed, and make the pedal hang in an orientation that causes it to be difficult to clip into the pedal. Regarding the mountain bike side of the pedal, the market is dominated by SPD™ cleats, so by making the mountain bike side of the pedal for this SPD™ cleat, about 80% of the world market will fit. The road bike side remains a big problem.

Generally, the exercise clubs offer the pedals sold to them with the exercise or spin bike by the particular spin bike manufacturer. To get around the problem, the gym may have to purchase spin bikes from a number of suppliers or change the pedals on their existing bikes to accommodate a wider variety of user preferences. However, depending on the group of cyclists for any particular spin class, inevitably, there are too many of one type of pedal and not enough of another. Typically, riders do not want to change their cleats for a spin class, although some resort to buying a spin class set of shoes and cleats instead of being able to use the bike shoes and cleats that they already have. Loaning shoes to spin class participants is a poor solution, as it costs the business time and money, and for hygiene reasons, many people do not like to wear borrowed shoes, particularly ones that have been sweated profusely in. Switching out pedals for each class is another possible solution, yet a great hassle for the business, time consuming, and can cause wear on the crank arm threads.

It would be desirable for a spin bike pedal to accommodate a greater percentage of clipless road pedal cleats without the use of adapters. It would further be desirable for a spin bike pedal to easily adjust to accommodate different clipless road pedal shoe cleats. When using adapters, it would also be desirable for a spin bike pedal to lock adapters into position and for the adapters to be manually removable in an easier way. Various aspects of the present disclosure address this particular need, as will be discussed in more detail below.

BRIEF SUMMARY

The present disclosure pertains to a bicycle pedal that accommodates a greater percentage of clipless pedal cleats without the use of adapters, and an even higher percentage with the use of adapters. Adapters, to great advantage, lock into the pedal rather than only being held in by spring force, and are easily removed with little force. This pedal is greatly advantageous for spin bike businesses, as well as end users. Spin bike business employees can fit the majority of their customers with far less hassle and time and cost, and users will usually be able to use the shoes and cleats that they use on their own bikes.

According to one embodiment, there is provided a bicycle pedal adapted for use with a plurality of different shoe cleats each having a respective cleat configuration. The bicycle pedal includes a front hook adapted to be engageable with a first portion of a shoe cleat, a cleat contact surface coupled to the front hook and adapted to be engageable with a second portion of the shoe cleat, and a rear hook coupled to the cleat contact surface and adapted to be engageable with a third portion of the shoe cleat. The front hook, cleat contact surface, and rear hook define an engagement configuration complimentary to the cleat configuration and are configured such that the engagement configuration is selectively adjustable to conform to the cleat configuration.

The bicycle pedal may additionally include a base coupled to the front hook, the cleat contact surface, and the rear hook. At least one of the front hook, the cleat contact surface, and the rear hook may be configured to be slidable relative to the base to facilitate selective adjustment of the engagement configuration. At least one of the front hook, the cleat contact surface, and the rear hook may be configured to be rotatable relative to the base to facilitate selectively adjustment of the engagement configuration. The bicycle pedal may further include a movable element coupled to the base and including at least one of the front hook, the cleat contact surface, and the rear hook, with the movable element being movable to at least two defined positions relative to the base, each defined position being associated with a respective cleat configuration. A locking mechanism may be coupled to the movable element and the base, with the locking mechanism being configured to restrict movement of the movable element relative to the base when the movable element is located within one of the defined positions. The locking mechanism may be transitional between an unlocked configuration to enable movement between the movable element and the base, and a locked configuration to restrict movement between the movable element and the base, the locking mechanism being spring biased toward the locked configuration.

The bicycle pedal may include a base having a first side and an opposing second side, with the front hook, the cleat contact surface, and the rear hook being coupled to the first side of the base. An engagement element may be coupled to the second side of the base and may be selectively engageable with a mountain bike type pedal shoe cleat.

The engagement configuration may be adjustable to enable engagement with at least two different shoe cleats.

The bicycle pedal may include a base pivotally coupled to the rear hook. The rear hook may include an extension arm adapted to enable manual pivotal adjustment of the rear hook relative to the base to effectuate release of the cleat from the bicycle pedal.

According to another embodiment, there is provided a bicycle pedal for use with a bicycle crank arm and a road type bicycle shoe cleat. The bicycle pedal includes a base pivotably about a pivot axis and adapted to be connectable to a bicycle crank arm. A plurality of contact regions are coupled to the base and include a front hook for receiving a front lip of the road type bicycle shoe cleat, a pivotably rear hook for receiving a rear lip of said road type bicycle shoe cleat, and a top surface extending along said base for supporting a bottom surface of the road type bicycle shoe cleat. One of the three contact regions defines an adjustable region and is adjustable relative to the base in order to properly fit different road type bicycle shoe cleats to the bicycle pedal.

The adjustable region may be translatable relative to the base. The adjustable region may be rotatable relative to the base.

A locking mechanism may be coupled to the adjustable region and the base, with the locking mechanism being configured to restrict movement of the adjustable region relative to the base when the movable element is located in a defined position.

A locking mechanism may be coupled to the adjustable region and the base, with the locking mechanism being configured to restrict movement of the adjustable region relative to the base when the adjustable region is located within a defined position.

According to another embodiment, there is provided a bicycle pedal comprising a first mechanism having a first cleat contact surface, with the first mechanism being adapted to be engageable with a road type bicycle shoe cleat. The bicycle pedal further includes a second mechanism having a second cleat contact surface, with the second mechanism being adapted to be engageable with a mountain type bicycle shoe cleat. The first cleat contact surface and the second cleat contact surface are less than 150 degrees apart from each other.

The first mechanism may include a front hook and a rear hook disposed on opposed sides of the first cleat contact surface. The second mechanism may include a front latch and a rear latch disposed on opposed sides of the second cleat contact surface. The first mechanism may be adjustable to individually accommodate a plurality of different road type bicycle shoe cleats.

The present disclosure addresses fitting the most popular road pedal cleats in a novel way by allowing a simple adjustment. By varying the position of at least one of the three contact areas on the pedal, the pedal may be used with approximately 75% of road cleats in use today. The small differences in cleat length may be accommodated by fore/aft movement of a rear latch.

Some of the many advantages of the present invention when used on exercise bikes and other cycling equipment are: (a) the pedal may allow for immediate use without adapters of an exercise bike by the majority of cyclists who wear shoe cleats made by leading manufacturers of mountain style pedals; (b) the pedal may allow use with adapters for non-cycling shoes; (c) exercise clubs may not have to inventory a wide variety of pedals for their exercise bikes to meet the needs of their clients; (d) exercise clubs may standardize their exercise bikes to one type of pedal design which may fit the largest majority of rider's bicycle shoes; (e) the rider may wear his favorite cycling shoes and cleat type, while exercising in the gym without having to change anything; (f) the rider may not have to carry a pedal wrench and spare pedals to the gym when he goes to exercise on the gym's exercise bikes; (g) the rider may not have to change the pedals on the gym's exercise bike to fit his shoe cleats before he can ride the exercise bike; (h) sports and exercise clubs may offer a wide combination of pedal/cleat designs on all their exercise bikes, while fitting all of their bikes with only the flip-flop pedals of the present invention; (i) the pedal may allow the sports club to advertise their bikes to a broader range of public; (j) the pedal may reduce the occurrence of pedal crank-thread stripping on exercise bikes in gyms, which may be caused by too frequent change of pedals by various riders; (k) companies that rent bikes to riders such as tour companies may fit most riders' shoes without adapters or the need to change pedals.

Further novel features and other objects of the present disclosure will become apparent from the following detailed description, discussion and the appended claims, taken in conjunction with the drawings.

BRIEF DESCRIPTION OF THE DRAWINGS

These and other features and advantages of the various embodiments disclosed herein will be better understood with respect to the following description and drawings, in which:

FIG. 11 is a front view of the three different road type shoe cleats that may be used with the bicycle pedal depicted in FIG. 1;

FIG. 12 is a sectioned perspective view of the three different road type shoe cleats of FIG. 11 taken along line 11-11;

FIG. 13 is a side sectional view of the three road type shoe cleats shown in FIG. 11;

FIG. 53 is a bottom view of the third embodiment of the bicycle pedal;

FIG. 54 is a front view of the third embodiment of the bicycle pedal;

FIG. 55 is a first side view of the third embodiment of the bicycle pedal;

FIG. 56 is a second side view of the third embodiment of the bicycle pedal;

FIG. 57 is a top view of the third embodiment of the bicycle pedal;

Common reference numerals are used throughout the drawings and the detailed description to indicate the same elements.

DETAILED DESCRIPTION

The detailed description set forth below in connection with the appended drawings is intended as a description of certain embodiments of a bicycle pedal and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

FIGS. 1-10 relate to a first embodiment of a bicycle pedal 10, which is easily and quickly adjustable to fit different road type shoe cleats. As will be described in more detail below, the bicycle pedal 10 is specifically configured for use with a plurality of different road type shoe cleats, with each shoe cleat being engaged with the bicycle pedal 10 via at least three areas/regions/points of contact between the bicycle pedal 10 and the shoe cleat. However, in view of the fact that different road type shoe cleats have different dimensional relationships between these three areas of contact, the bicycle pedal 10 is adjustable to properly fit different road type shoe cleats. In particular, at least one of the three areas/regions/points of contact associated with the bicycle pedal 10 may be adjusted to conform the pedal 10 to a particular shoe cleat.

The following description and corresponding figures make reference to the bicycle pedal 10 being specifically configured and adapted for use with three different road type shoe cleats, although it is understood that some embodiments of the bicycle pedal 10 may be adapted for use with only two shoe cleats, while other embodiments of the bicycle pedal 10 may be adapted for use with more than three shoe cleats. In this regard, the present disclosure is not limited to any particular number of shoe cleats that may be accommodated by the bicycle pedal 10.

Figure 1:
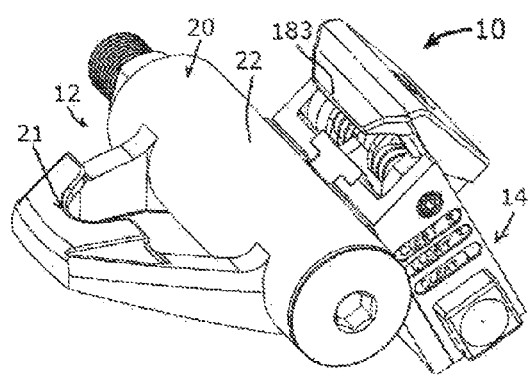
FIG. 1 is an upper perspective view of a first embodiment of a bicycle pedal adjustable to accommodate a plurality of different bicycle shoe cleats.
Figure 2:
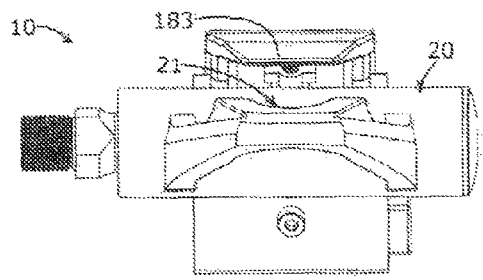
FIG. 2 is a front view of the bicycle pedal depicted in FIG. 1.
Figure 3:
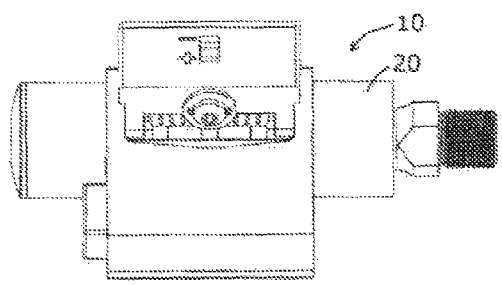
FIG. 3 is a rear view of the bicycle pedal depicted in FIG. 1.
Figure 4:
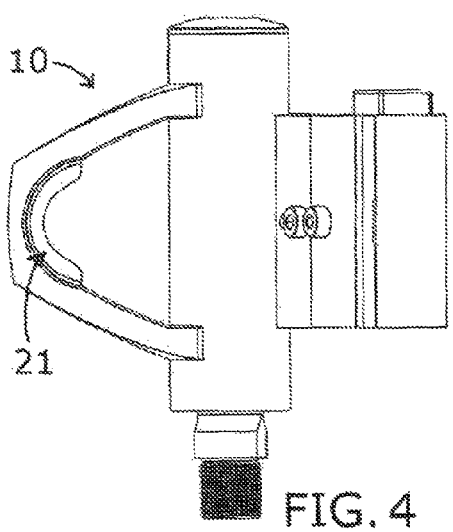
FIG. 4 is a bottom view of the bicycle pedal depicted in FIG. 1.
Figure 5:
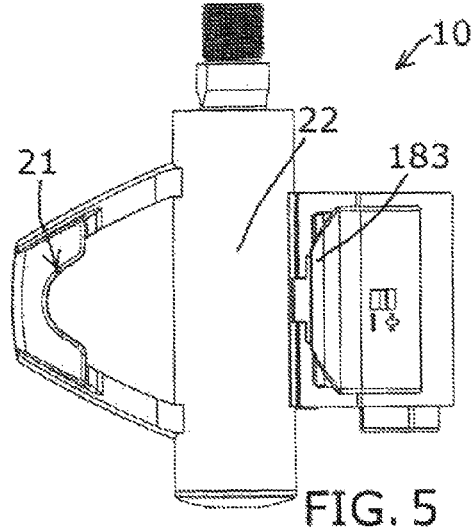
FIG. 5 is a top view of the bicycle pedal depicted in FIG. 1.
Figure 6:
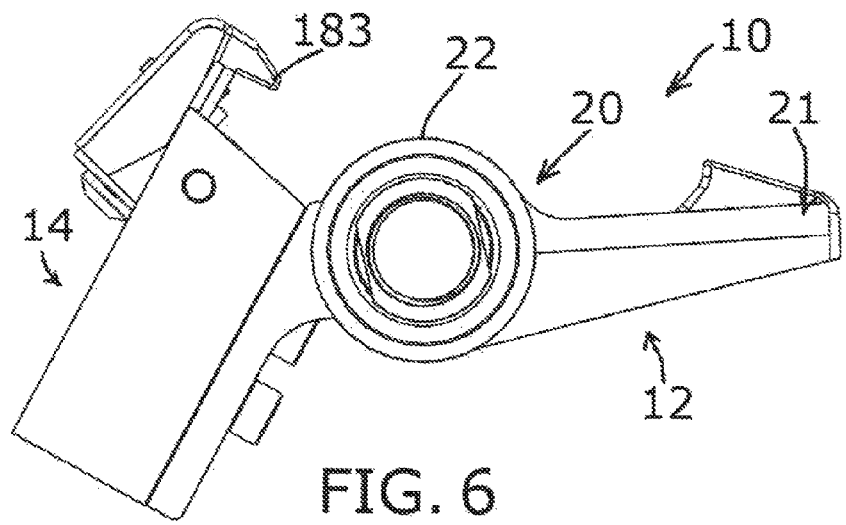
FIG. 6 is a side view of the bicycle pedal depicted in FIG. 1.
Figure 7:
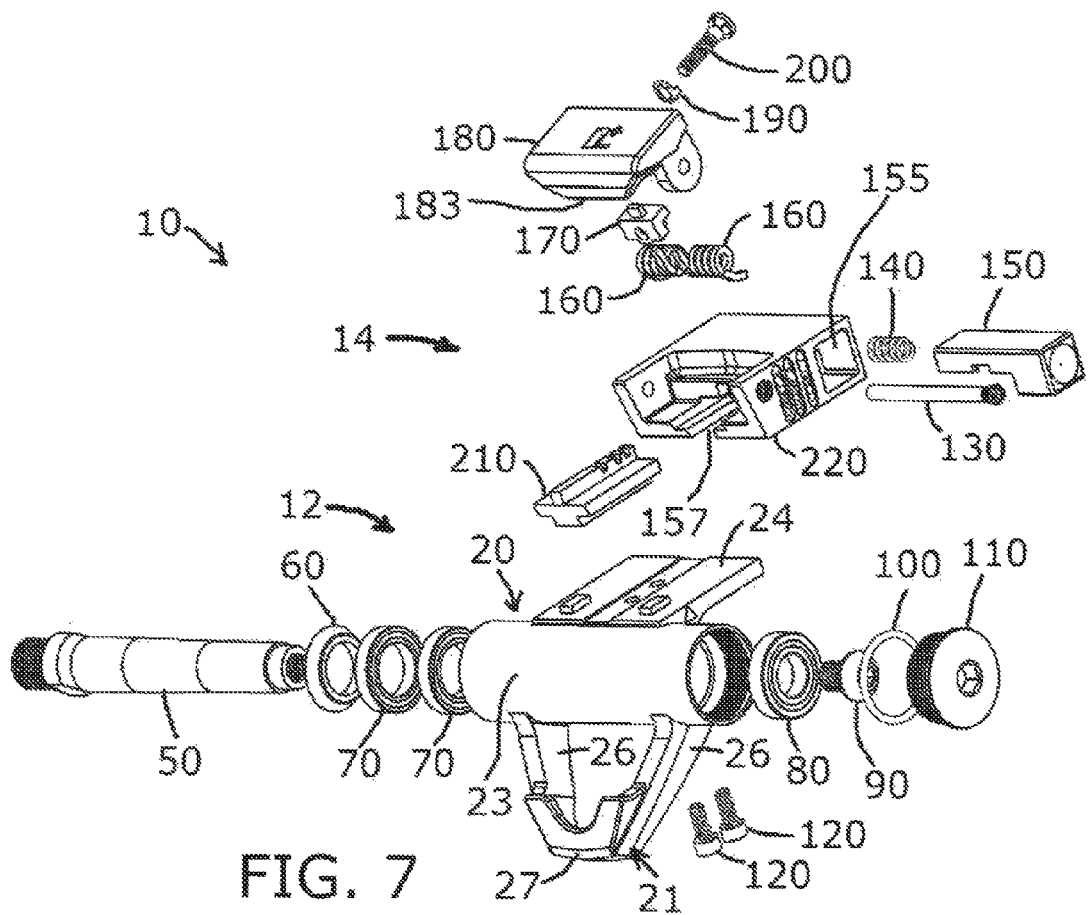
FIG. 7 is an exploded view of the bicycle pedal depicted in FIG. 1.

FIG. 7 is an exploded perspective view of one embodiment of the bicycle pedal 10. The bicycle pedal 10 is generally comprised of a body assembly 12, a latch assembly 14, and two screws 120. The body assembly 12 is specifically configured and adapted to pivotally connect to a bicycle crank arm of a bicycle. As used herein, the term "bicycle" refers broadly to conventional bicycles (e.g., road bicycles, mountain bicycles, etc.), as well as exercise bicycles (e.g., "spin" bicycles). The body assembly 12 includes a main body or base 20, an axle 50, a seal 60, cartridge bearings 70 and 80, a screw 90, an o-ring 100, and an end cap 110. The base 20 refers to the portion of the pedal 10 that is coupled to the bicycle crank arm or other similar structure (e.g., crank wheel, etc.). In the exemplary embodiment, the base 20 includes a cylindrical housing 23 having a hollow interior, a front hook 21 which extends from an outer surface of the cylindrical housing 23, and a mounting plate 24, which also extends from the outer surface of the cylindrical housing 23 in spaced relation to the front hook 21. A portion of the cylindrical housing forms a cleat contact surface 22, which is adapted to interface with a cleat of a bicycle shoe, as will be described in more detail below. The front hook 21 includes a pair of hook arms 26 and a hook distal end portion 27 extending between the pair of hook arms 26 in spaced relation to the cylindrical housing 23 and defining an enclosed end of the front hook 21. The mounting plate 24 includes a pair of tabs 32 and holes 28, the purpose of which will be explained in more detail below.

Latch assembly 14 is comprised of a threaded pin 130, a spring 140, a button 150, springs 160, a tension adjuster plate 170, a latch 180, a detent ring 190, a screw 200, a slide lock 210, and a latch housing 220. The latch housing 220 includes a cavity 155 which at least partially receives the button 150. The latch housing 220 also includes a slot 157 which receives a corresponding tongue formed on the slide lock 210. The latch 180 is pivotally coupled to the latch housing 220 and forms a rear hook 183, which will be described in more detail blow.

The front hook 21, cleat contact surface 22, and rear hook 183 collectively define an engagement configuration, which is complimentary to a corresponding cleat of a bicycle shoe so as to enable the cleat to "clip in," engage with, or be received within the bicycle pedal 10. One aspect of the present disclosure relates to the adjustability of the engagement configuration by adjusting the position of one of the front hook 21, cleat contact surface 22 and rear hook 183 relative to the remaining two of the front hook 21, cleat contact surface 22 and rear hook 183. The adjustment of the engagement configuration allows the bicycle pedal 10 to be used with a wide range of different bicycle shoe cleats having different cleat configurations.

Screws 120 secure latch assembly 14 to body assembly 12. When assembled, latch assembly 14 (except for slide lock 210, which is fixed to body 20) can slide and lock into three different positions relative to body assembly 12. This enables bicycle pedal 10 to properly fit three different brands of road type shoe cleats, wherein each brand of shoe cleat defines a unique cleat configuration. Three of the more popular shoe cleats available today include those manufactured by Shimano™, Keo™, and Delta™, although it is understood that other shoe cleats are available, and may be used with the bicycle pedal 10.

Figure 8:
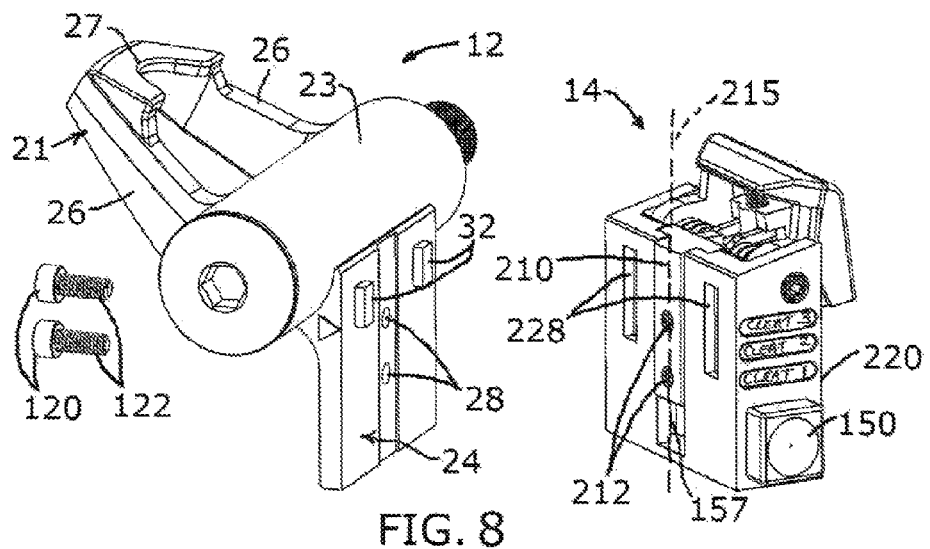
FIG. 8 is a partially exploded view of the bicycle pedal depicted in FIG. 1.

FIG. 8 is a partially exploded view of the bicycle pedal 10 showing the body assembly 12 and the latch assembly 14 in their respective assembled configurations. Threads 122 of screws 120 pass through holes 28 of body 20 and tighten to corresponding threaded holes 212 of slide lock 210, which is received within the slot 157 formed on the latch housing 220. In this regard, the screws 120 fixedly attach the slide lock 210 to the mounting plate 24 of the body assembly 12. When the bicycle pedal 10 is completely assembled, button 150 may be selectively pushed or actuated to allow the latch housing 220 to slide along a slide axis 215 defined by slide lock 210 and lock into three different positions, wherein each position is associated with a particular shoe cleat configuration, as will be described in more detail below. Tabs 32 formed on the body 20 fit into respective slots 228 formed on the latch housing 220 in order to limit the sliding movement possible between latch assembly 14 and body assembly 12.

Figure 9:
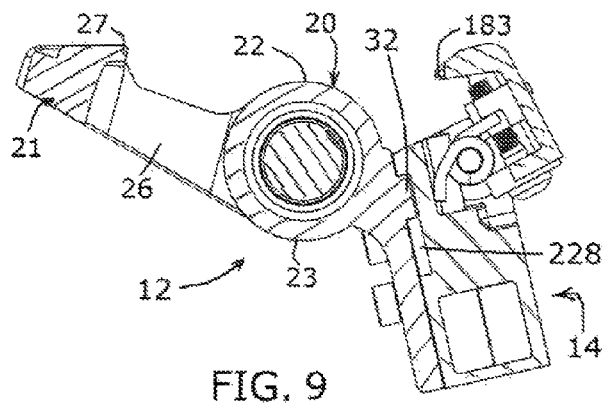
FIG. 9 is a side cross sectional view of the bicycle pedal depicted in FIG. 1.

FIG. 9 shows a section side view of bicycle pedal 10. Tab 32 fit into slot 228 in order to limit the sliding movement possible between latch assembly 14 and body assembly 12. The position of the tabs 32 shown in FIG. 9 is associated with a particular shoe cleat. It is understood that the tabs 32 could be positioned at other locations within the slot 228 when used with other cleats, such as being located at a midway point of the slot 228, or at the other ends of the slot 228. In this regard, the location of the tabs 32 within the slot 228 corresponds to the particular shoe cleat with which the pedal 10 is intended to be used.

Figure 10:
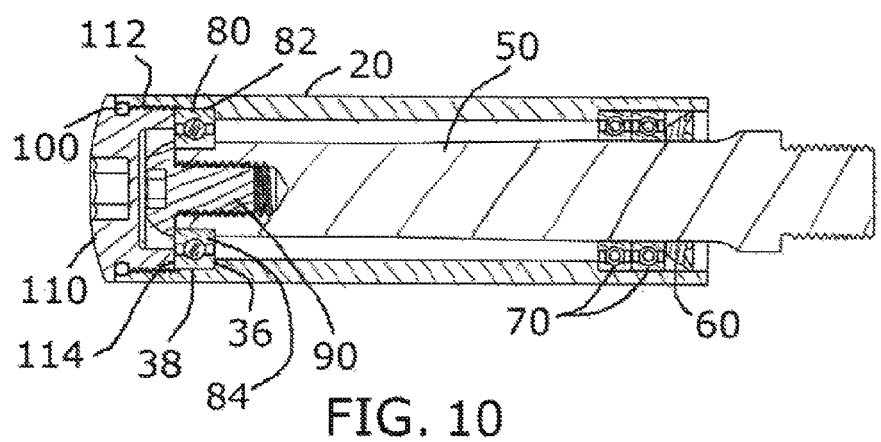
FIG. 10 is a side cross sectional view of a body assembly of the bicycle pedal depicted in FIG. 1.

FIG. 10 is an exemplary cross sectional view of one embodiment of the body assembly 12. Outer race 82 of cartridge bearing 80 is fixed within body 20 surface 38 and against shoulder 36 of body 20. End cap 110 threads 112 force surface 114 against cartridge bearing 80, which is then forced against shoulder 36 of body 20 so that the outer race 82 is fixed. Axle 50 is fixed to inner race 84 of cartridge bearing 80 by screw 90 so the axle 50 can freely rotate but not move axially. Cartridge bearings 70 also support axle 50, and seal 60 prevents contamination from contacting cartridge bearings 70 and 80.

FIG. 11 is a front view of the three different road type shoe cleats that fit bicycle pedal 10, namely a first cleat 240, a second cleat 250, and a third cleat 260. FIG. 12 is a perspective view sectioned along 11-11 of the three different road type shoe cleats 240, 250, 260, while FIG. 13 is a side sectional view of the three road type shoe cleats shown in FIG. 11. First cleat 240 includes a front lip 241, a bottom surface 242, and a rear lip 243 defining a first cleat configuration. Second cleat 250 includes a front lip 251, a bottom surface 252, and a rear lip 253 defining a second cleat configuration. Third cleat 260 includes a front lip 261, a bottom surface 262, and a rear lip 263 defining a third cleat configuration. The first, second, and third cleats 240, 250, 260 may correspond to the Delta™ cleat, Keo™ cleat, and Shimano™ cleat, which comprise approximately 75% of the current market. In this regard, it is contemplated that the adjustability of the bicycle pedal 10 allows the pedal 10 to be used with approximately 75% of the market by virtue of the compatibility with the first, second, and third cleats 240, 250, 260, without employing any separate adapters.

When clipped into a pedal, a road type shoe cleat is typically supported by front and rear lips thereof, as well as a bottom surface, which typically resides between the front and rear lips, (see FIGS. 17-25). Conventional pedals can only fit one road type shoe cleat because the relationship between the front lip, back lip, and bottom surface varies too much between different cleats. Indeed, there is significant variation between the three areas of contact, namely the front and rear lips and the bottom surface. For example, it can be seen that the first cleat 240 includes front lip 241 spaced from the bottom surface 242 by a distance $D_{1a}$, which may be equal to approximately 5.1 mm, and a rear lip 243 spaced from the bottom surface 242 by a distance $D_{2a}$, which may be equal to approximately 8.5 mm. Furthermore, the second cleat 250 includes front lip 251 spaced from the bottom surface 252 by a distance $D_{1b}$, which may be equal to approximately 1.1 mm, and a rear lip 253 spaced from the bottom surface 252 by a distance $D_{2b}$, which may be equal to approximately 6.1 mm. Furthermore, the third cleat 260 includes front lip 261 spaced from the bottom surface 262 by a distance $D_{1c}$, which may be equal to approximately 4.3 mm, and a rear lip 263 spaced from the bottom surface 262 by a distance $D_{2c}$, which may be equal to approximately 5.4 mm. The differences between $D_{1a-c}$, and $D_{2a-c}$, from one cleat to the next are so big that conventionally, a road pedal is designed to fit only one type of cleat, and any other cleat used would either not correctly engage, or if it partially engaged, would have far too much play to effectively or safely use the cleat with the pedal. Along these lines, it is imperative that when a cleat is engage with a pedal that the cleat be securely connected thereto, while still allowing a prescribed degree of twist, with such twisting motion serving two functions: twist may be the motion used to "clip out" of the pedal (e.g., disengage), and also a few degrees of rotational (twist) play is desired by most riders for knee health/comfort. However, all other motions may be restricted by the three areas of contact. In order for the cleat to perform in this desired manner, the cleat is typically supported by the front and rear lips and the bottom surface.

Figure 14:
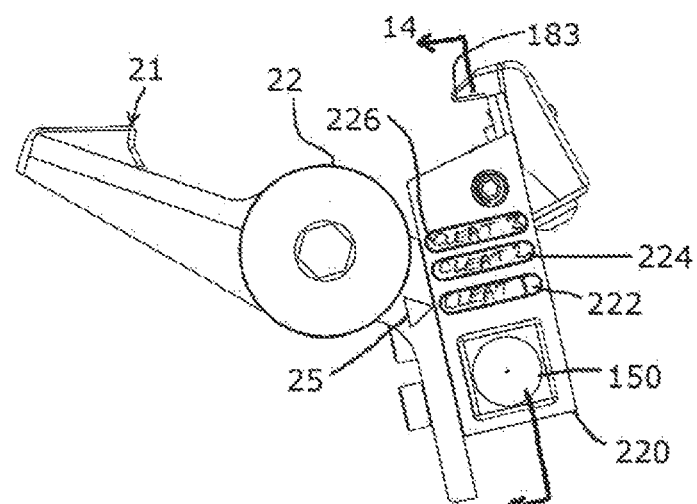
FIG. 14 is a side view of bicycle pedal adjusted to fit a first cleat.
Figure 15:
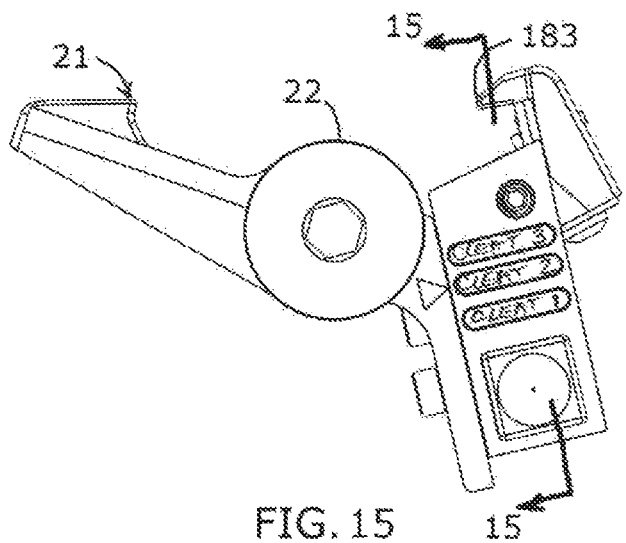
FIG. 15 is a side view of bicycle pedal adjusted to fit a second cleat.
Figure 16:
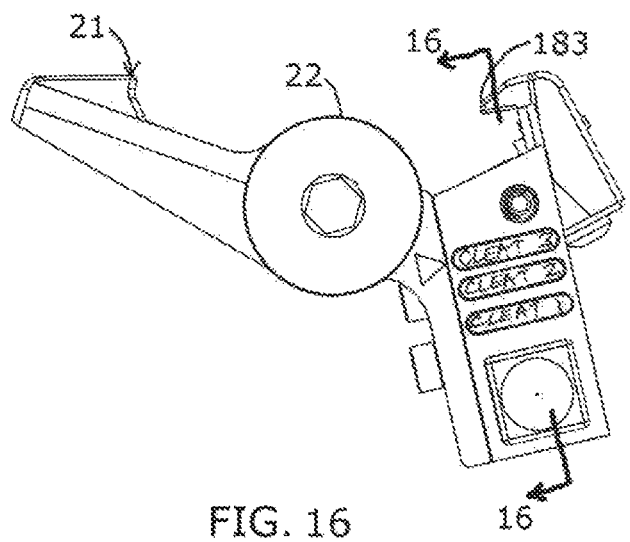
FIG. 16 is a side view of bicycle pedal adjusted to fit a third cleat.
Figure 17:
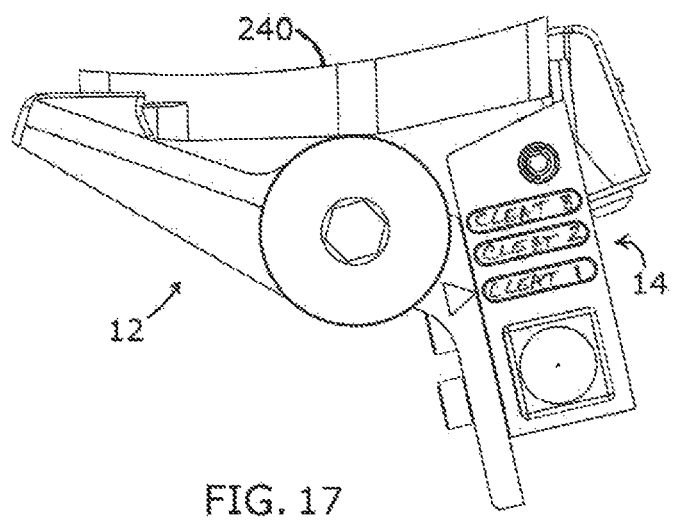
FIG. 17 is a side view of bicycle pedal engaged with the first cleat.
Figure 18:
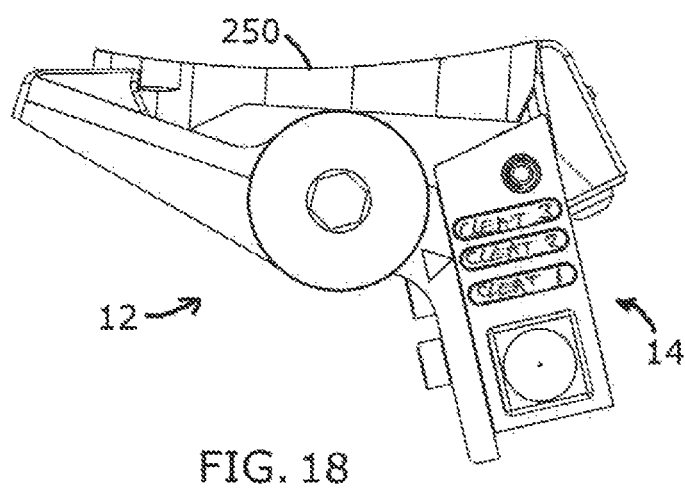
FIG. 18 is a side view of bicycle pedal engaged with the second cleat.
Figure 19:
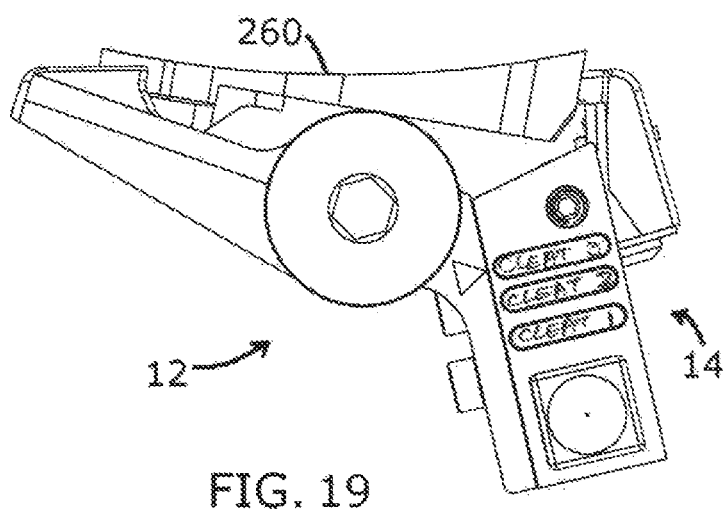
FIG. 19 is a side view of bicycle pedal engaged with the third cleat.
Figure 20:
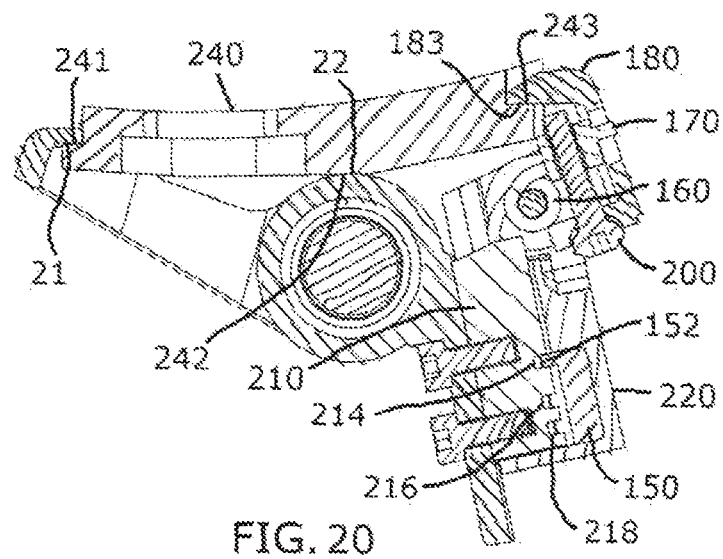
FIG. 20 is a center cross sectional view of the bicycle pedal shown in FIG. 17.
Figure 21:
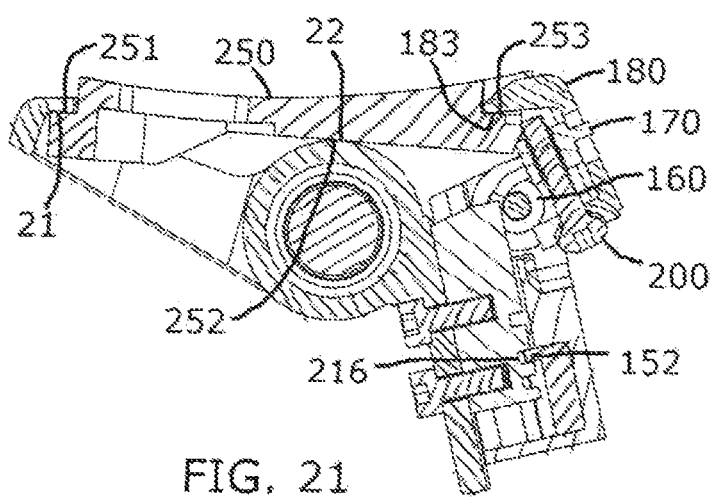
FIG. 21 is a center cross sectional view of the bicycle pedal shown in FIG. 18.
Figure 22:
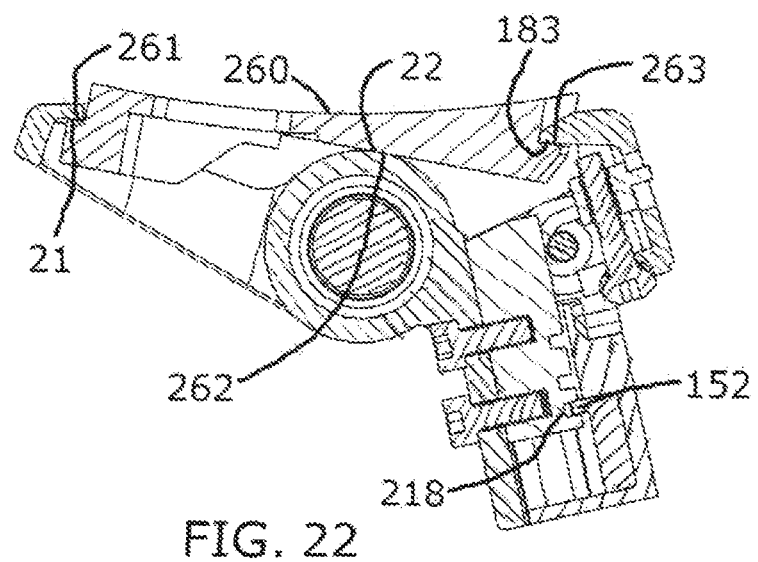
FIG. 22 is a center cross sectional view of the bicycle pedal shown in FIG. 19.
Figure 23:
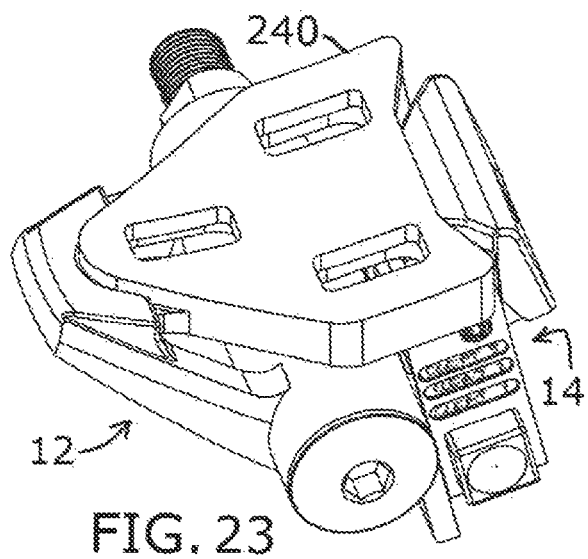
FIG. 23 is an upper perspective view of the bicycle pedal engaged with the first cleat.
Figure 24:
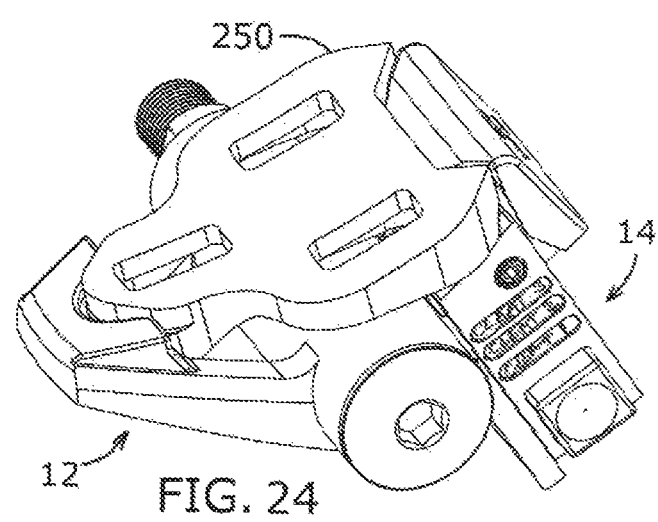
FIG. 24 is an upper perspective view of the bicycle pedal engaged with the second cleat.
Figure 25:
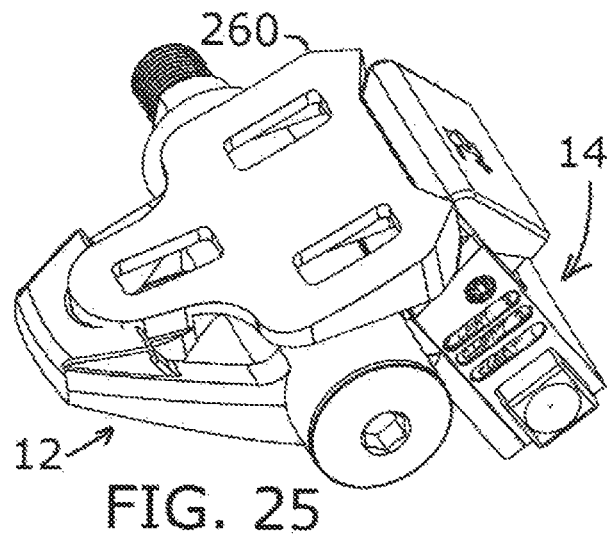
FIG. 25 is an upper perspective view of the bicycle pedal engaged with the third cleat.

FIG. 14 is a side view of bicycle pedal 10 adjusted to fit first cleat 240. It is easy to adjust the pedal 10 to cooperate with the different cleats by simply pressing button 150 and moving latch assembly 14 until pointer 25 is aimed at the desired cleat name/indicator. In this regard, FIG. 14 shows the pointer 25 pointing to a first indicator 222 associated with a pedal configuration corresponding to the first cleat 240. FIG. 15 is a side view of bicycle pedal 10 adjusted to fit the second cleat 250, with the pointer 25 pointing to a first indicator 224 associated with a pedal configuration corresponding to the second cleat 250. FIG. 16 is a side view of bicycle pedal 10 adjusted to fit the third cleat 260, with the pointer 25 pointing to a third indicator 226 associated with a pedal configuration corresponding to the third cleat 260.

Referring now to FIGS. 17-25, there is depicted corresponding side views (e.g., FIGS. 17-19), side sectional views (e.g., FIGS. 20-22), and upper perspective views (e.g., FIGS. 23-25) of bicycle pedal 10 engaged with the first, second, and third cleats 240, 250, 260. Each cleat 240, 250, 260 is captured by the pedal via three areas/points/regions of contact. As can be seen, the position of the latch assembly 14 relative to the body assembly 12 varies as the pedal 10 adjusts to accommodate the different cleats 240, 250, 260.

With regard to the first cleat 240, a front lip 241 is captured by a front hook 21, a rear lip 243 is captured by spring biased rear hook 183, and cleat 240 bottom surface 242 is supported by surface 22. In this way, first cleat 240 is completely engaged and fully supported and stable in preferably all directions, except twisting, which is necessary to retain desired rotational "float" and to allow the rider to disengage from the pedal by twisting. Tab 152 of button 150 is locked into first locking slot 214 of slide lock 210, which creates the pedal configuration to work correctly with the first cleat 240. Latch 180 is spring loaded via springs 160, as is commonplace in road pedals, and screw 200 is used to adjust spring tension from weaker to stronger depending on rider preference, although most riders prefer a generally middle setting. Tension adjuster plate 170 also functions as a tension indicator, as is also commonplace in the art.

With regard now to the second cleat 250, a front lip 251 is captured by front hook 21, rear lip 253 is captured by latch 180 rear hook 183, and cleat 250 bottom surface 252 is supported by body 20 surface 22. In this way, second cleat 250 is completely engaged and fully supported and stable, preferably in all directions except twisting, which may be necessary to retain desired rotational "float" and to allow the rider to disengage from the pedal by twisting. Tab 152 of button 150 is locked into second locking slot 216 of slide lock 210, which creates the pedal configuration to work correctly with second cleat 250.

Referring now to the third cleat 260, the front lip 261 is captured by front hook 21, rear lip 263 is captured by latch 180 rear hook 183, and cleat 260 bottom surface 262 is supported by surface 22. In this way, third cleat 260 is completely engaged and fully supported and stable, preferably in all directions except twisting, which may be necessary to retain desired rotational "float" and to allow the rider to disengage from the pedal by twisting. Tab 152 of button 150 is locked into third locking slot 218 of slide lock 210, which creates the pedal configuration to work correctly with the third cleat 260.

The foregoing illustrates that the bicycle pedal 10 is adapted for use with first, second, and third road type shoe cleat 240, 250, and 260, wherein each cleat engages with three areas of contact on the pedal 10, comprising the front hook 21, the cleat contact surface 22, and the spring biased rear hook 183, and wherein the position of the areas of contact relative to each other is adjustable in order to accommodate the different cleats 240, 250, and 260. Bicycle pedal 10 employs a sliding mechanism for adjusting the position of the three areas of contact of the pedal 10, however, it is understood that the position of the three areas of contact may be adjusted or transitioned using other adjustment mechanisms known by those skilled in the art, such as rotational adjustment mechanisms.

Referring now to FIGS. 26-31, there is shown sectional views of the latch assembly 14 illustrating movement of the inner components of the latch assembly 14 as the latch assembly 14 transitions between the various positions associate with each cleat. According to one embodiment, selective and incremental movement of the latch assembly 14 achieved by the button 150, a locking mechanism 151 having a locking tab 152 formed thereon, and the slide lock 210 having a plurality of locking slots 214, 216, 218. Generally speaking, when the locking tab 152 is received within one of the locking slots 214, 216, 218 the latch assembly 14 is locked relative to the body assembly 12. However, when the locking tab 152 is removed from the locking slots 214, 216, 218, the latch assembly 14 may be moved relative to the body assembly 12. Thus, by selectively placing the tab 152 in the slots 214, 216, 218, the latch assembly 14 may be locked relative to the body assembly 12 in different positions, with each position corresponding to a separate engagement configuration.

Figure 26:
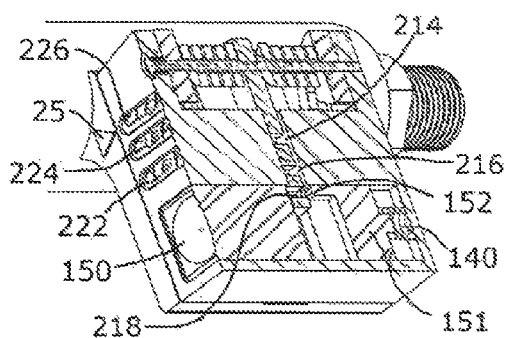
FIG. 26 is a cross section of the latch assembly showing a button actuated to unlock a locking mechanism from a third locking slot.

Referring first to FIG. 26, there is shown a sectional view taken along line 16-16 showing button 150 pressed or actuated to engage with a locking mechanism 151, which in turn is biased toward the button 150 by spring 140. As the button 150 is pressed, the button overcomes the biasing force of the spring 140, which results in removal of the tab 152 from third locking slot 218, and thus, the latch assembly 14 is no longer locked. Latch assembly 14 is now free to be moved to fit any of the three different cleats 240, 250, or 260. If the button 150 were released in the position depicted in FIG. 26, spring 140 would bias the button 150 back to its outward position and tab 152 would be received into the third locking slot 218, and the pedal 10 would be confirmed to cooperatively engage with the third cleat 260. When tab 152 is aligned with third locking slot 218, pointer 25 of body 20 points towards a third cleat indicator 226 so that the rider easily knows which cleat the pedal 10 is ready to accept.

Figure 27:
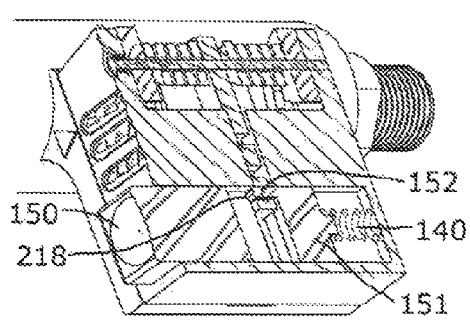
FIG. 27 is a cross section of the latch assembly showing the button released to lock the locking mechanism in the third locking slot.

FIG. 27 is a sectional view taken along line 16-16, with the pedal 10 being locked and ready for engagement with a third cleat 260. In this regard, the button 150 is released, tab 152 is locked into the third locking slot 218, and pointer 25 of body 20 points towards the third cleat indicator 226 so that the rider easily knows which cleat the bicycle pedal 10 is ready to accept.

Figure 28:
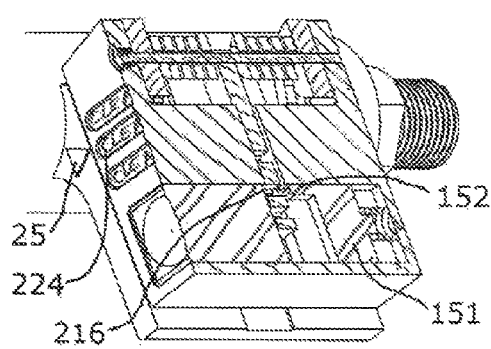
FIG. 28 is a cross section of the latch assembly showing the button actuated to unlock a locking mechanism from a second locking slot.

FIG. 28 is a sectional view taken along line 15-15, showing button 150 pressed so that the tab 152 is removed from the second locking slot 216. Latch assembly 14 is now free to be moved to fit any of the three different cleats 240, 250, or 260. If the button 150 were released in this shown position, spring 140 would return button 150 back to its outward position and tab 152 would be received within the second locking slot 216, and the bicycle pedal 10 would be ready to accept the second cleat 250. When the tab 152 is aligned with second locking slot 216, pointer 25 of body 20 points towards a second cleat indicator 224 so that the rider easily knows which cleat the pedal 10 is ready to accept.

Figure 29:
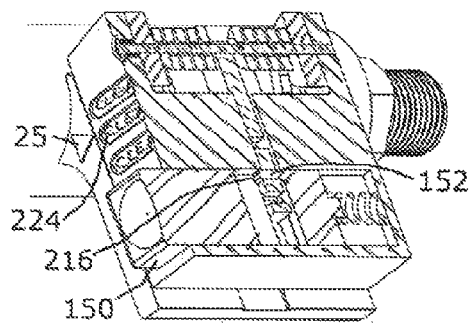
FIG. 29 is a cross section of the latch assembly showing the button released to lock the locking mechanism in the second locking slot.

FIG. 29 is a sectional view taken along line 15-15, depicting pedal 10 locked and ready for use with the second cleat 250. Tab 152 is locked into the second locking slot 216, and pointer 25 of body 20 points towards a second cleat indicator 224 so that the rider easily knows which cleat the bicycle pedal 10 is ready to accept.

Figure 30:
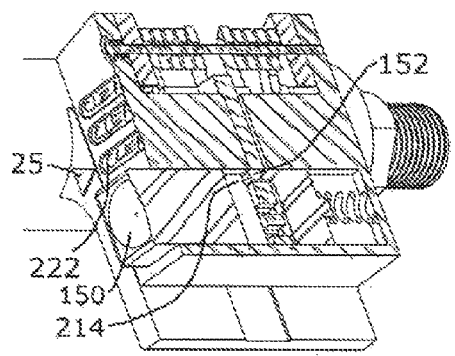
FIG. 30 is a cross section of the latch assembly showing the button released to lock the locking mechanism in a first locking slot.

FIG. 30 is a sectional view taken along line 14-14 showing bicycle pedal 10 locked and ready for use with a first cleat 240. The button 150 is released, tab 152 is locked into a first locking slot 214, and pointer 25 of body 20 points towards a first cleat indicator 222 so that the rider easily knows which cleat the bicycle pedal 10 is ready to accept.

Figure 31:
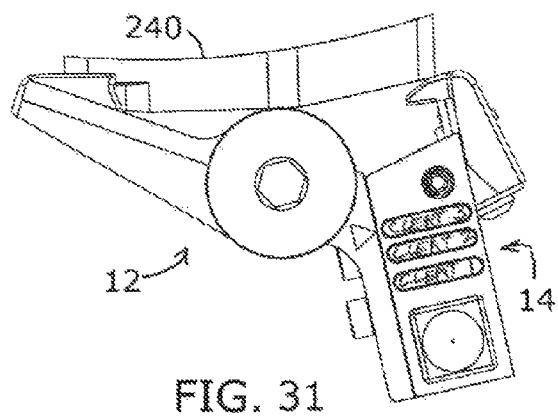
FIG. 31 is a side view illustrating lack of compatibility between the bicycle pedal and the first cleat when the bicycle pedal is not in a cleat configuration which accommodates the first cleat.
Figure 32:
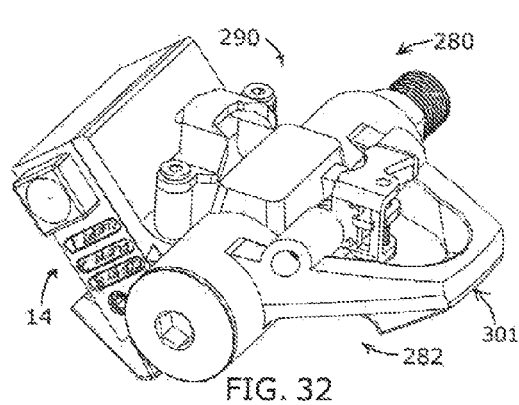
FIG. 32 is a lower perspective view of a second embodiment of a bicycle pedal.
Figure 33:
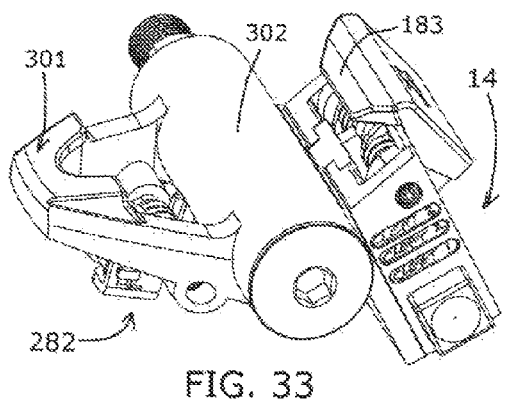
FIG. 33 is an upper perspective view of the bicycle pedal depicted in FIG. 32.

FIG. 31 is a side view showing how a first cleat 240 is not designed to engage with the bicycle pedal 10 when the pedal 10 is adjusted to the third cleat configuration, e.g., the configuration of the pedal 10 adapted for use with the third cleat 260. This demonstrates how a pedal designed for one cleat may not work properly with another. However, bicycle pedal 10 can be quickly adjusted to cooperate with the first cleat 240 by pressing button 150 and sliding latch assembly 14 until pointer 25 points at first cleat indicator 222. Transitioning between cleat configurations typically requires only a few seconds per pedal 10.

Referring now to FIGS. 32-37, there is shown a second embodiment of a bicycle pedal 280, which on one side adapts the same as the first embodiment of bicycle pedal 10 to fit the previously mentioned cleats 240, 250, and 260, and on the other side has an engagement mechanism 290 for a mountain bike type shoe cleat 390. As such, the bicycle pedal 280 includes enhanced functionality and adaptability, by virtue of its ability to adjust to a plurality of road type cleats, but also, can be used with a mountain bike type cleat.

Bicycle pedal 280 is generally comprised of a body assembly 282 and a latch assembly 14 and two screws 120. Body assembly 282 is comprised of a mountain bike cleat mechanism 290, a body 300, an axle 50, a seal 60, cartridge bearings 70 and 80, a screw 90, an o-ring 100, and an end cap 110. Bicycle pedal 280 has all the functions and advantages of bicycle pedal 10 and in addition has the advantage of fit a mountain bike cleat 390 on another side. Currently, a Shimano SPD™ cleat dominates about 80% of the total mountain bike cleat market, and so by using a mountain bike cleat mechanism 290 which cooperates with such cleat 390, bicycle pedal 280 may accommodate about 75% of road type cleats (as described above) and about 80% of mountain bike type cleats. However, it is understood that the present disclosure is not limited to use with any particular road cleat mountain bike cleat.

Figure 34:
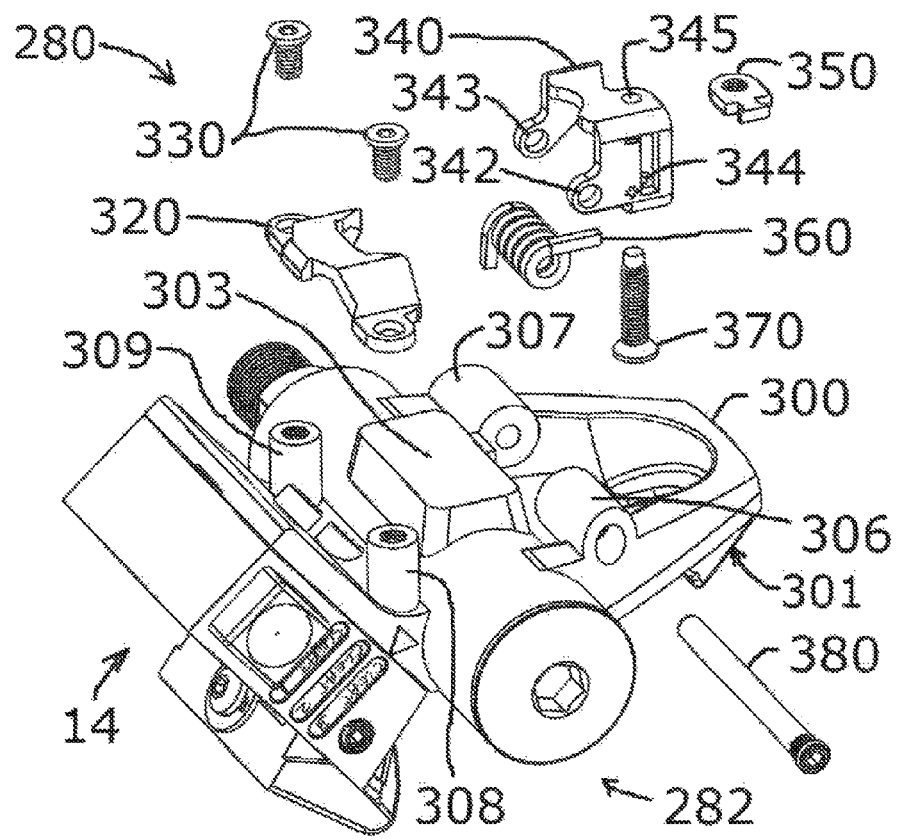
FIG. 34 is a partial exploded perspective view of the bicycle pedal depicted in FIG. 32.

FIG. 34 is an partially exploded view of the bicycle pedal 280, which is comprised of all the same parts as bicycle pedal 10 except body 300 is different from body 20 in that body 300 has a threaded boss 306, boss 307, threaded bosses 308 and 309, and a surface 303. Also, the bicycle pedal 280 has a common mountain bike cleat engagement mechanism 290 which is comprised of a front latch 320, two screws 330, a rear latch 340, tension adjuster plate 350, spring 360, screw 370, and threaded pin 380. Threaded pin 380 is adapted to be advanced through threaded boss 306, hole 342 of rear latch 340, spring 360, hole 343 of latch 340, and into boss 307. Screw 370 goes through hole 344 of rear latch 340, and is threaded to tension adjuster plate 350, and into hole 345.

Figure 35:
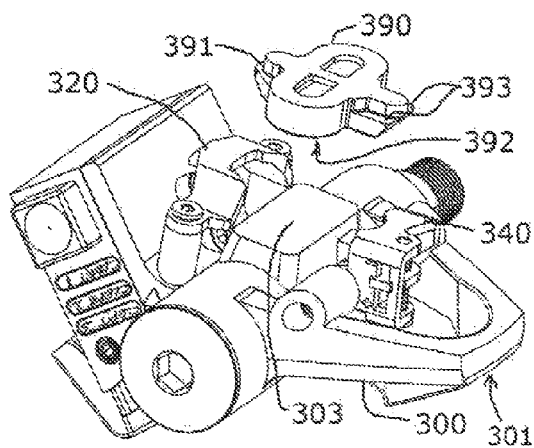
FIG. 35 is a perspective view of a mountain bike cleat spaced from the bicycle pedal depicted in FIG. 32.

FIG. 35 is a perspective view showing a mountain bike cleat 390 above bicycle pedal 280. Mountain bike cleat 390 has three surfaces of contact, namely a front lip 391, a bottom surface 392, and a rear lip 393.

Figure 36:
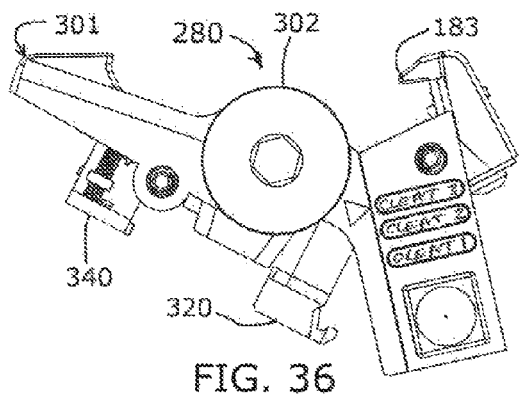
FIG. 36 is a side view of the bicycle pedal depicted in FIG. 32.
Figure 37:
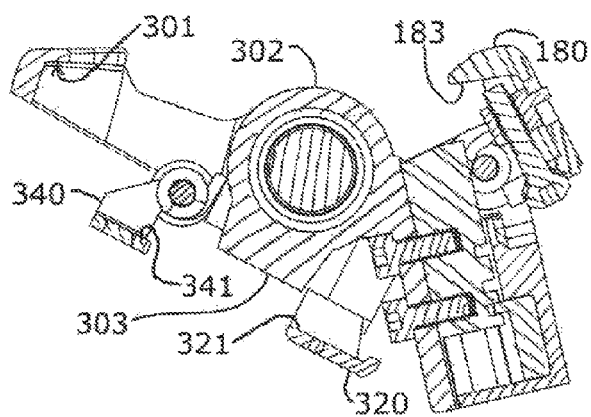
FIG. 37 is a side cross sectional view of the bicycle pedal depicted in FIG. 32.

FIGS. 36 and 37 include a side view and a sectional view of the bicycle pedal 280 ready to accept either a third road cleat 260 on the road side or a mountain bike cleat 390 on another side. When engaged to a mountain bike cleat 390, front lip 391 is hooked under front hook 321 of front latch 320, rear lip 393 is hooked under rear hook 341, and bottom surface 392 is supported by surface 303. When engaged to a road bike cleat such as third cleat 260, front lip 261 is hooked under front hook 301 of body 300, rear lip 263 is hooked under rear hook 183 of latch 180, and bottom surface 262 is supported by cleat contact surface 302. The bicycle pedal 280 is adapted for use with any one of a road type shoe cleat 240, 250, and 260 to engage with three areas of contact comprising a front hook 301, a cleat contact surface 302, and the spring biased rear hook 183, and wherein the position of the areas of contact relative to each other is selectively adjustable in order to accommodate the different cleats 240, 250, and 260. Bicycle pedal 280 uses a sliding mechanism for adjusting the position of the three areas of contact. Disengagement of the cleat from the pedal 280 is achieved from a twisting action.

Referring now to FIGS. 38-57, there is shown a third embodiment of a bicycle pedal 400 which on one side adapts or adjusts in a slightly different way to fit the previously mentioned cleats 240, 250, and 260. In particular, bicycle pedal 400 is adapted for use with a road type shoe cleat 240, 250, 260 by engaging with three areas of contact, with those areas on the pedal 400 comprising a front hook 421, a cleat contact surface 422, and a spring biased rear hook 533, and wherein the position of the areas of contact relative to each other is selectively and rotationally adjustable in order to accommodate the different cleats 240, 250, and 260. In this respect, bicycle pedal 400 uses a rotational mechanism for adjusting the position of the three areas of contact.

Figure 38:
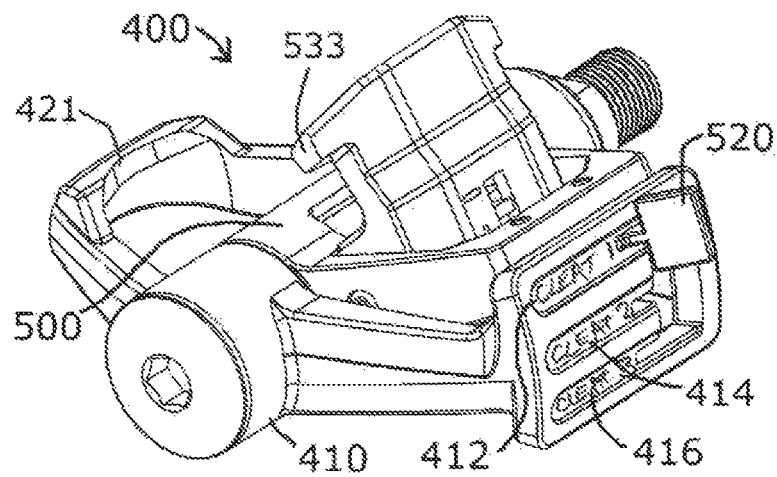
FIG. 38 is an upper perspective view of a third embodiment of a bicycle pedal in a first position.
Figure 39:
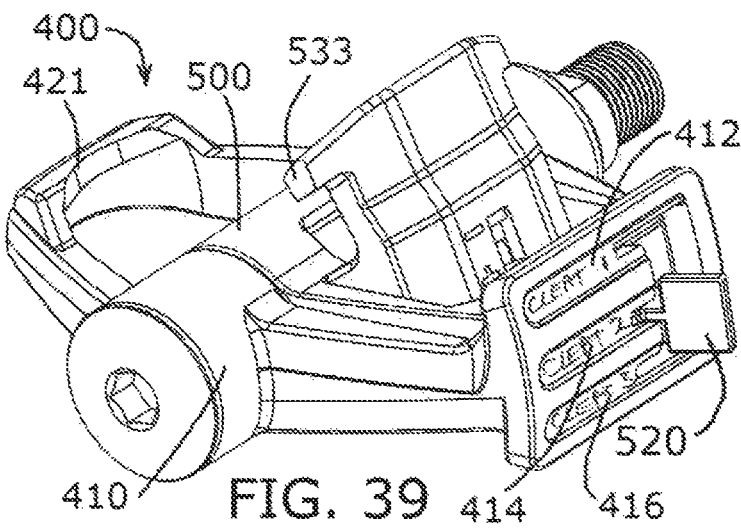
FIG. 39 is an upper perspective view of the third embodiment of the bicycle pedal in a second position.
Figure 40:
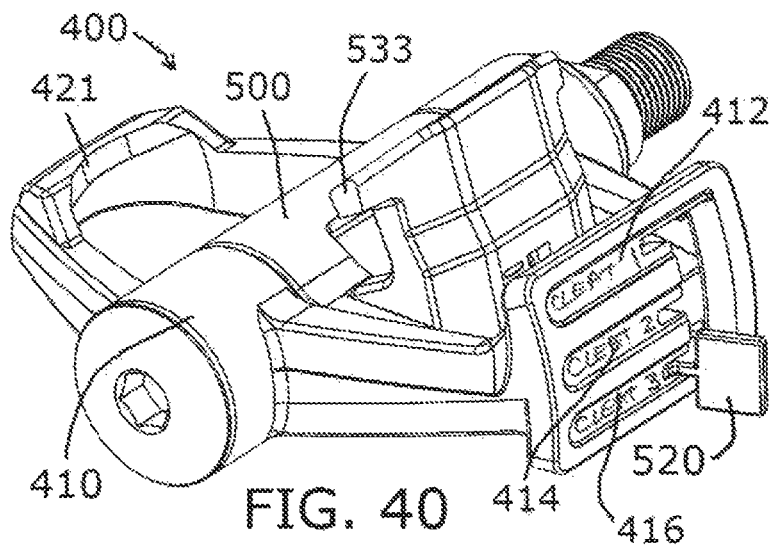
FIG. 40 is an upper perspective view of the third embodiment of the bicycle pedal in a third position.

The pedal 400 includes a latch housing 500 adapted to pivot relative to body 410 as will be better shown in FIGS. 41-51. In FIG. 38, bicycle pedal 400 is ready to accept first cleat 240, with button 520 being locked on first cleat indicator 412, as will be better explained in relation to FIGS. 49 and 50. FIG. 39 shows a perspective view of bicycle pedal 400 ready to accept a second cleat 250, with button 520 being locked on second cleat indicator 414. FIG. 40 shows a perspective view of a bicycle pedal 400 ready to accept third cleat 260, with button 520 being locked on third cleat indicator 416. As will be seen, any of three different road type shoe cleats 240, 250, and 260 may be selectively engaged with bicycle pedal 400 such that they are captured by three areas of contact. The adjustment for fitting the different cleats is by way of rotation, instead of sliding.

Figure 41:
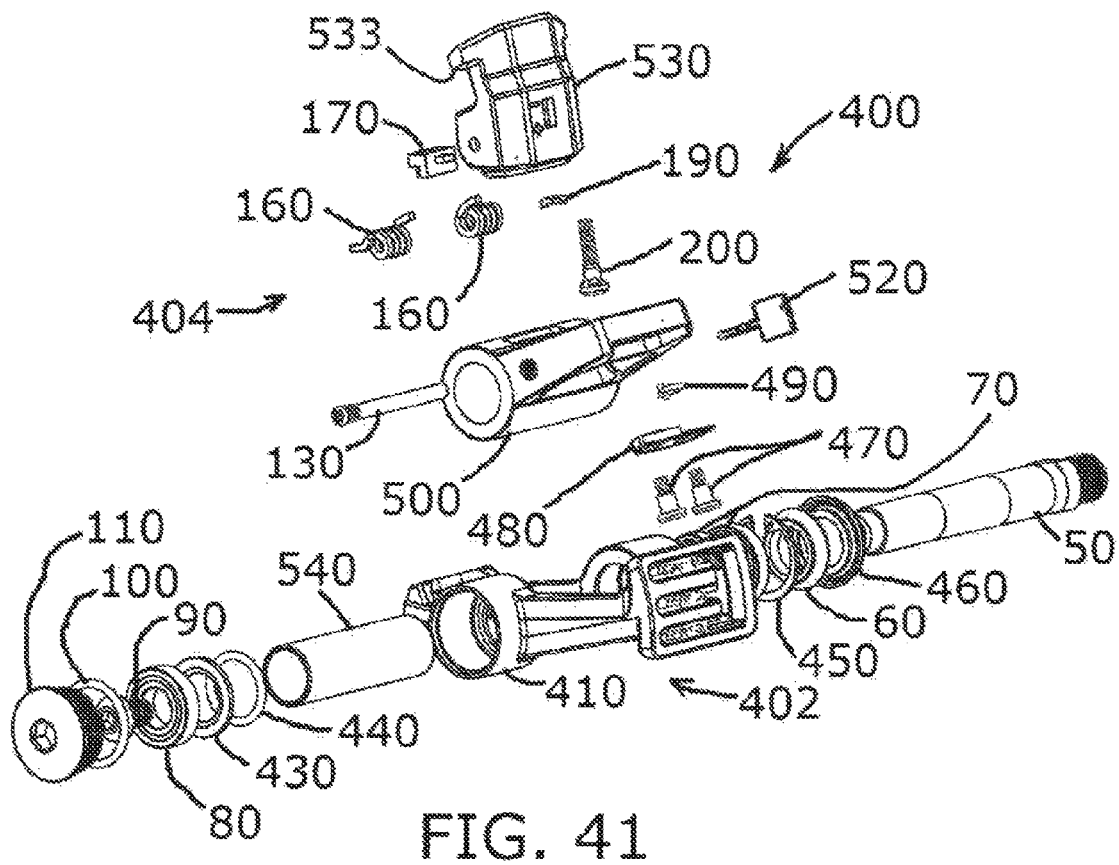
FIG. 41 is an exploded perspective view of the bicycle pedal depicted in FIG. 38.

FIG. 41 is an exemplary exploded view of the bicycle pedal 400 which includes a body assembly 402 and a latch assembly 404. Body assembly 402 is comprised of a body 410, an axle 50, an outer seal 460, a seal 60, a retainer ring 450, a sleeve 540, o-ring 440, spacer 430, cartridge bearings 70 and 80, a screw 90, an o-ring 100, and an end cap 110. Latch assembly 404 is comprised of a threaded pin 130, a latch housing 500, a spring 490, a cover 480, screws 470, button 520, latch 530, springs 160, tension adjuster plate 170, detent ring 190, a screw 200. Latch 530 defines hear hook 533. Latch assembly 404 pivots around sleeve 540 to enable the bicycle pedal 400 to properly fit three different road type shoe cleats including third cleat 260, second cleat 250, and first cleat 240.

Figure 42:
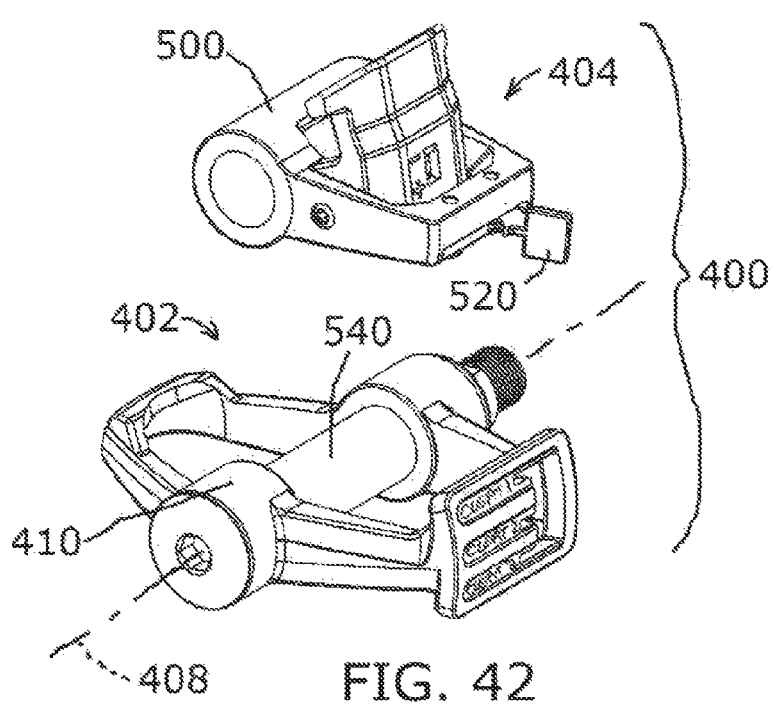
FIG. 42 is a partial exploded perspective view of the bicycle pedal depicted in FIG. 38.

FIG. 42 is a partially exploded view of bicycle pedal 400 which is comprised of the body assembly 402 and latch assembly 404. When assembled, latch housing 500 of latch assembly 404 is disposed about sleeve 540, which is coupled to body 410. When locking button 520 is pushed, latch housing 500 can selectively pivot relative to body 410 about pivot axis 408 and lock into three different positions in order to fit the three different cleats 240, 250, and 260. This provides each cleat three areas of contact so that each cleat is able to engage and have stability while being able to twist to disengage.

Figure 43:
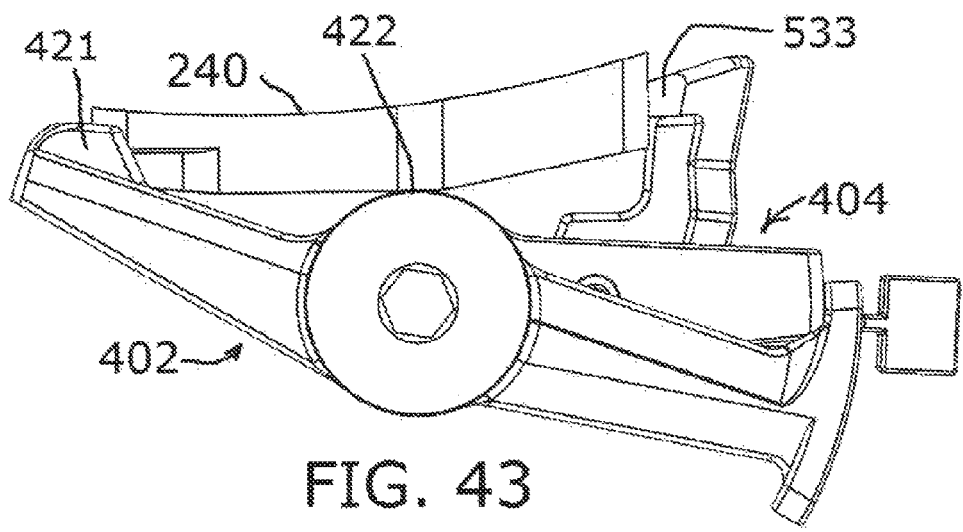
FIG. 43 is a side view of the third embodiment of the bicycle pedal engaged with the first cleat.
Figure 44:
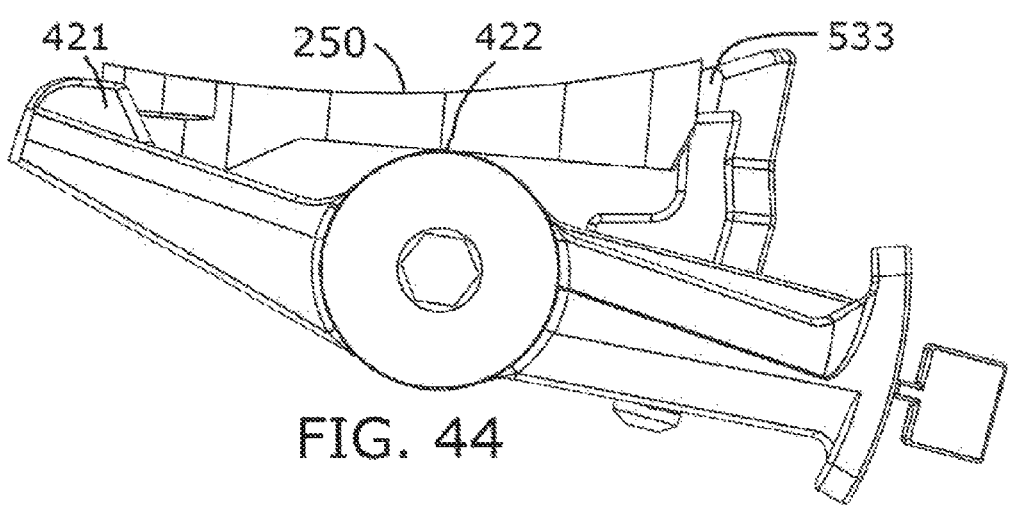
FIG. 44 is a side view of the third embodiment of the bicycle pedal engaged with the second cleat.
Figure 45:
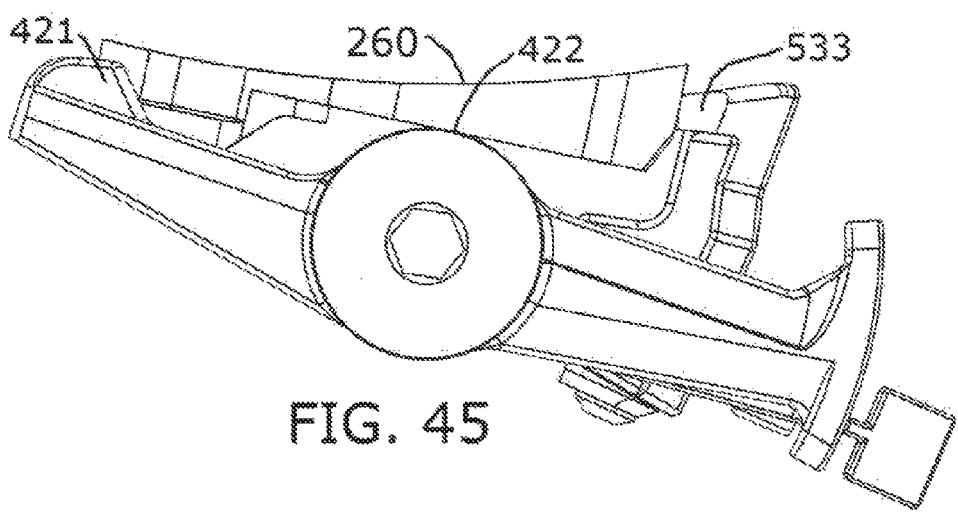
FIG. 45 is a side view of the third embodiment of the bicycle pedal engaged with the third cleat.

FIG. 43 is a side view of bicycle pedal 400 with first cleat 240 installed, FIG. 44 is a side view of bicycle pedal 400 with second cleat 250 installed, and FIG. 45 is a side view of bicycle cleat 400 with third cleat 260 installed. FIGS. 43-45 illustrate the difference in position of latch assembly 404 relative to body assembly 402 to accommodate the various cleats by the pedal 400.

Figure 46:
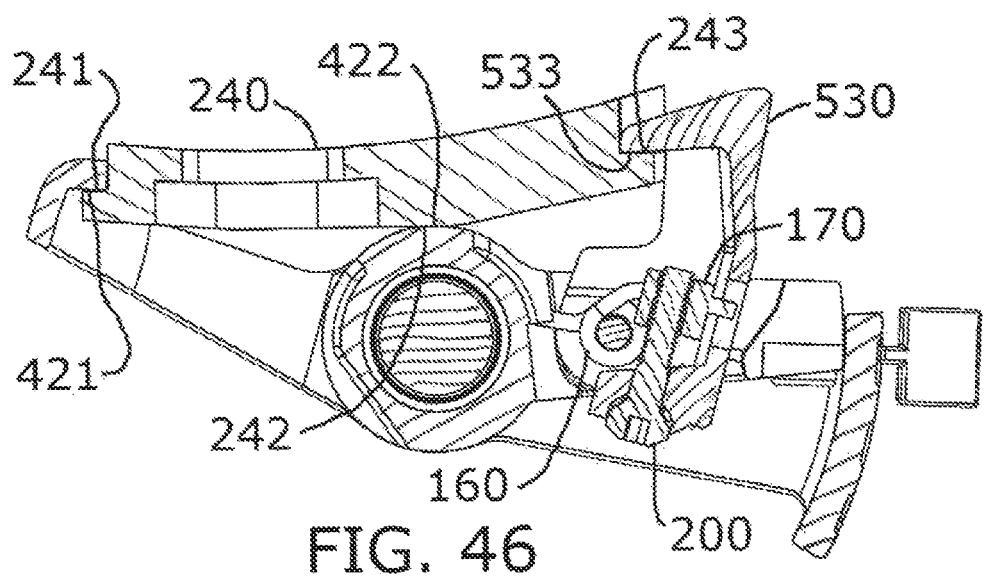
FIG. 46 is a side sectional view of the third embodiment of the bicycle pedal engaged with the first cleat.

FIG. 46 is a center section of the view shown in FIG. 43. First cleat 240 front lip 241 is captured by body 410 front hook 421, rear lip 243 is captured by latch 530 rear hook 533, and cleat 240 bottom surface 242 is supported by cleat contact surface 422. The front hook 421, rear hook 533 and cleat contact surface 422 collectively define an engagement configuration which is adjustable so as to be complimentary to the cleat configuration. In this way, first cleat 240 is completely engaged and fully supported and stable in preferably all directions except twisting, which is necessary to retain desired rotational "float" and to allow the rider to disengage from the pedal by twisting. Tab 522 of button 520 is locked into first locking slot 424 of body 410, better shown in FIGS. 49 and 50, which creates the pedal configuration to work correctly with first cleat 240. Latch 530 is spring loaded via springs 160 as is commonplace in road pedals, and screw 200 is used to adjust spring tension from weaker to stronger depending on rider preference, although most riders prefer a generally middle setting. Tension adjuster plate 170 also functions as a tension indicator, as is also commonplace in the art.

Figure 47:
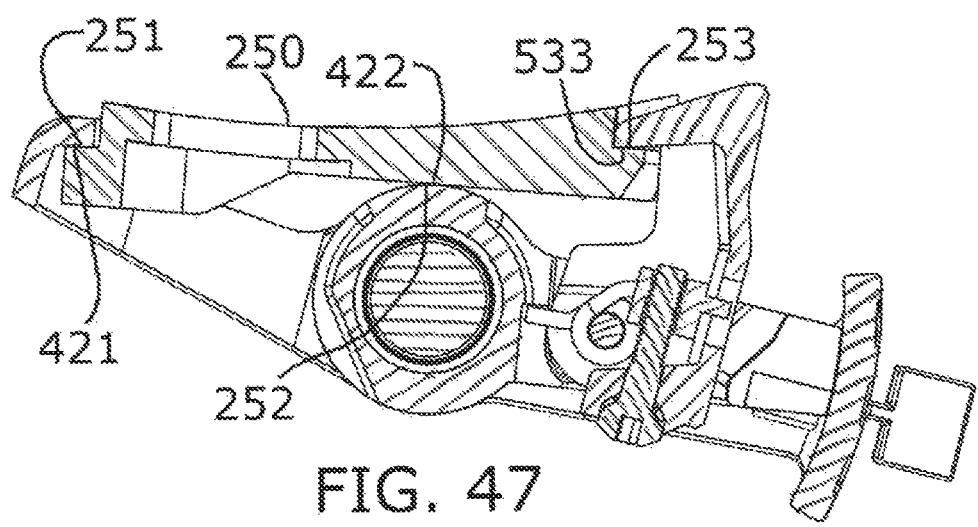
FIG. 47 is a side sectional view of the third embodiment of the bicycle pedal engaged with the second cleat.

FIG. 47 is a center section of the view shown in FIG. 44. Second cleat 250 front lip 251 is captured by body 410 front hook 421, rear lip 253 is captured by latch 530 rear hook 533, and cleat 250 bottom surface 252 is supported by body 410 surface 422. In this way, second cleat 250 is completely engaged and fully supported and stable in all directions except twisting, which is necessary to retain desired rotational "float" and to allow the rider to disengage from the pedal by twisting. Tab 522 of button 520 is locked into second locking slot 425 of body 410, which creates the pedal configuration to work correctly with the second cleat 250.

Figure 48:
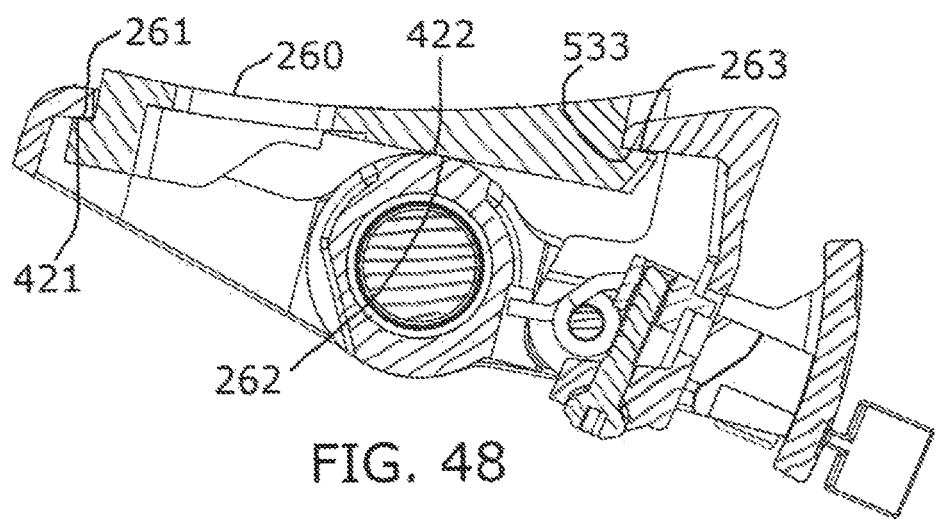
FIG. 48 is a side sectional view of the third embodiment of the bicycle pedal engaged with the third cleat.

FIG. 48 is a center section of the view shown in FIG. 45. Third cleat 260 front lip 261 is captured by body 410 front hook 421, rear lip 243 is captured by latch 530 rear hook 533, and cleat 260 bottom surface 262 is supported by body 410 surface 422. In this way, third cleat 260 is completely engaged and fully supported and stable in all directions except twisting, which is necessary to retain desired rotational "float" and to allow the rider to disengage from the pedal by twisting. Tab 522 of button 520 is locked into third locking slot 426 of body 410, which creates the pedal configuration to work correctly with Shimano cleat 260.

Figure 49:
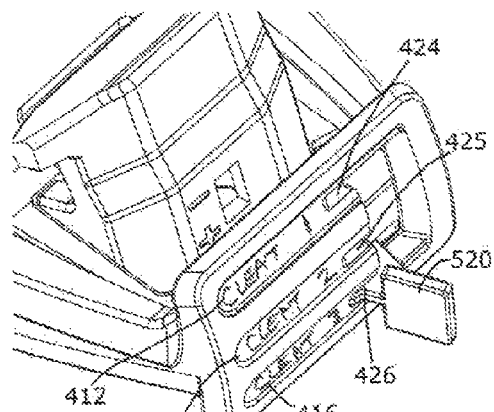
FIG. 49 is an enlarged, partial perspective view of the third embodiment of the bicycle pedal with a locking tab shown in a locked position.

FIG. 49 is an enlarged perspective view of bicycle pedal 400 adjusted to fit third cleat 260. Tab 522 of button 520 is locked into third locking slot 426 of body 410. Spring 490 biases button 520 into a locked position. First locking slot 424 and second locking slot 425 can also be seen. To help the rider know which cleat bicycle pedal 400 is adjusted to accept, first locking slot 424 is aligned with first cleat indicator 412 when the pedal 400 is configured for use with the first cleat 240, second locking slot 425 is aligned with second cleat indicator 414 when the pedal 400 is configured for use with second cleat 250, and third locking slot 426 is aligned with third cleat indicator 416 when the pedal 400 is configured for use with third cleat 260.

Figure 50:
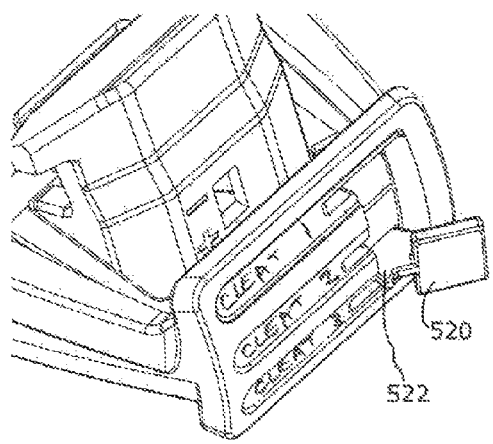
FIG. 50 is an enlarged, partial perspective view of the third embodiment of the bicycle pedal with the locking tab shown in an unlocked position.
Figure 51:
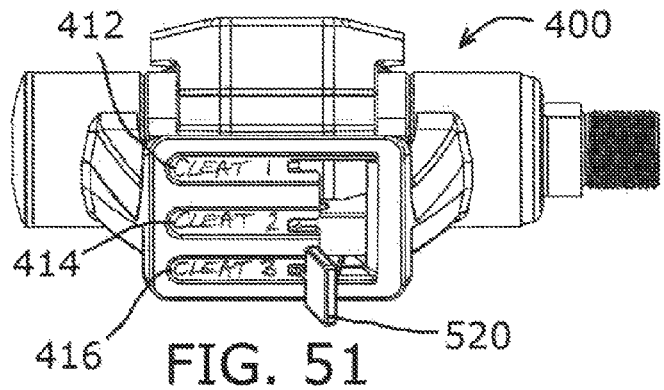
FIG. 51 is a rear view of the third embodiment of the bicycle pedal.

FIG. 50 is an enlarged perspective view of bicycle pedal 400 button 520 pressed so to remove the button 520 from the third locking slot 426 to unlock the latch assembly 404. With the button 520 removed from the locking slot 426, latch assembly 404 is now free to be moved to fit any of the three different configurations associated with the respective cleats 240, 250, or 260. If the button 520 were released in this shown position, spring 490 would return button 520 back to its outward position and tab 522 would lock into third locking slot 426, and the bicycle pedal 400 would be ready to accept third cleat 260. Tab 522 also indicates which cleat bicycle pedal 400 is ready to accept. For example, tab 522 is currently aligned with third cleat indicator 416 so that the rider easily knows that bicycle pedal 400 is ready to accept or engage with a third cleat 260. FIG. 51 is a rear view of bicycle pedal 400 adjusted to accept the third cleat 260.

Figure 52:
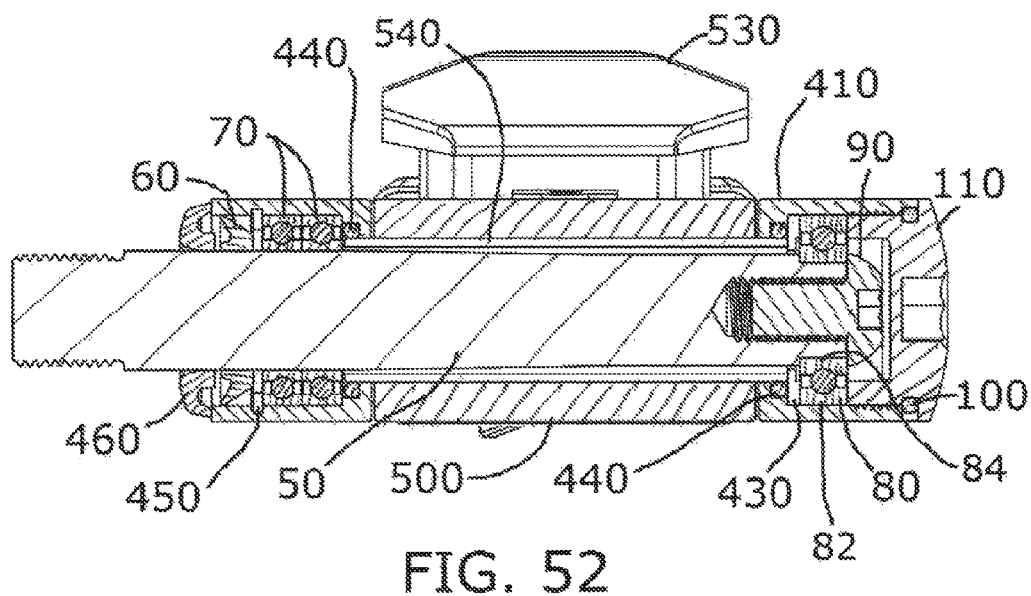
FIG. 52 is a cross sectional view of the third embodiment of the bicycle pedal.

FIG. 52 is a sectional view of bicycle pedal 400 taken alone line 56-56. Latch housing 500 pivots around sleeve 540, with sleeve 540 being captured on the outer diameter by body 410, and on the ends between cartridge bearing 70 and spacer 430. Outer race 82 of cartridge bearing 80 is fixed within body 410 in a fairly similar manner as bicycle pedal 10. Axle 50 is fixed to inner race 84 of cartridge bearing 80 by screw 90 so that axle 50 can freely rotate but not move axially. Cartridge bearings 70 also support axle 50, and seal 60 prevents contamination from contacting cartridge bearings 70 and 80. Outer seal 460 is additional protection from contamination. Retainer ring 450 prevents cartridge bearings 70 from possibly moving out of position, although is not essential in most cases.

Figure 58:
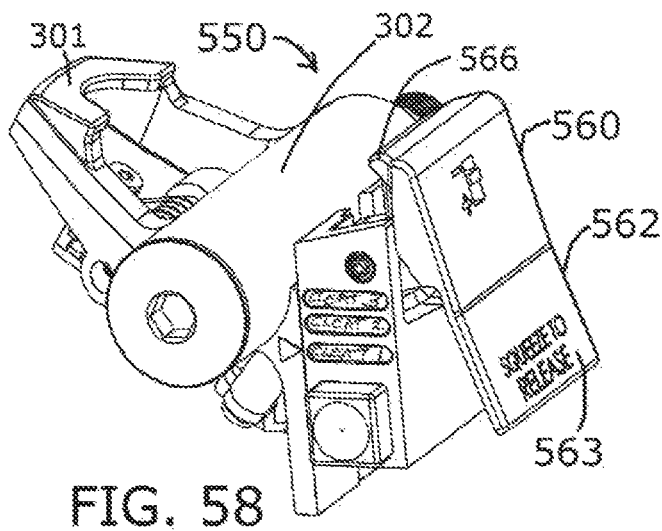
FIG. 58 is an upper perspective view of a fourth embodiment of a bicycle pedal.

FIG. 58 is a perspective view of fourth embodiment of a bicycle pedal 550 which is identical to second embodiment of the bicycle pedal 280 except there is a latch 560 instead of latch 180. Therefore, bicycle pedal 550 on one side adapts to fit the previously mentioned cleats 240, 250, and 260, and on the other side fits a mountain bike type shoe cleat 390. The differences of bicycle pedal 550 relative to bicycle pedal 280 will be explained in reference to FIGS. 61-68.

Figure 59:
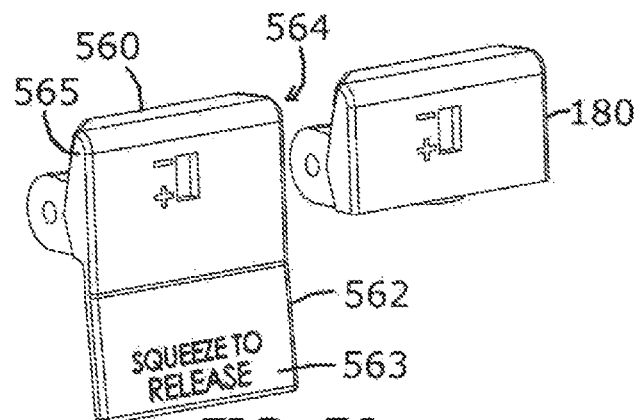
FIG. 59 is an upper perspective view offering a comparison of a latch associated with the fourth embodiment of the bicycle pedal, and a latch associated with the first embodiment of the bicycle pedal.

FIG. 59 is a perspective view that shows the difference between latch 560 and latch 180. Latch 560 is the same as latch 180 except that latch 560 has an extension 562 with a surface 563. Note that extension 562 is substantially perpendicular to hook surface 566 (see FIG. 67), which is distinguishable from previous pedal spars, which extend approximately parallel to the corresponding hook surface. As will be shown, it is advantageous for extension 562 to be approximately perpendicular to hook surface 566 because it allows a sideways squeezing activation motion rather than the downward push, as is required by many prior art pedal spars.

Figure 60:
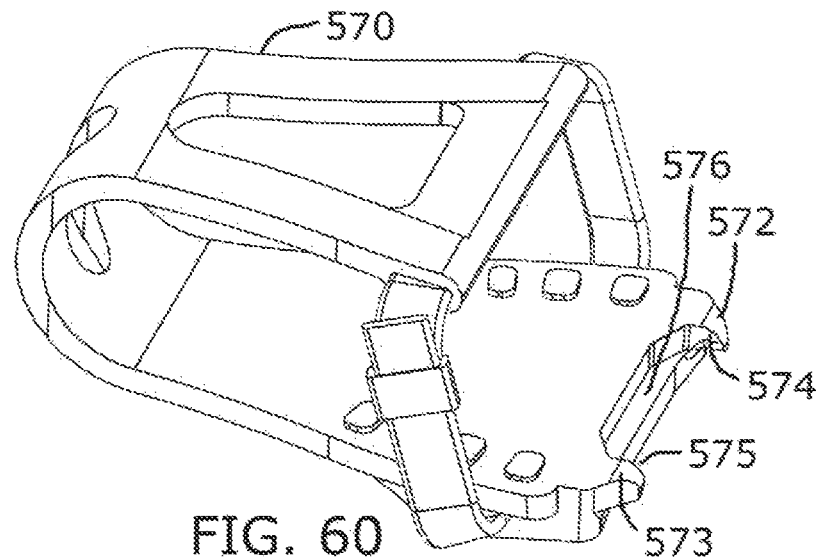
FIG. 60 is a perspective view of a shoe cleat adapter.

FIG. 60 is a perspective view of cleat adapter 570. Adapters are common in the art for adapting a road pedal to work with regular shoes (e.g., shoes that do not have cleats). However, cleat adapter 570 has an additional advantage in that it has protrusions 572 and 573 with surfaces 574 and 575, which serve to prevent adapter 570 from twisting out of bicycle pedal 550. When cleat adapter 570 is installed into bicycle pedal 550, surfaces 564 and 565 of latch 560 are in close contact with surfaces 574 and 575, respectively, to prevent cleat adapter 570 from being able to twist out. As will be seen, cleat adapter 570 can be easily removed by a squeezing motion. The cleat adapter 570 may have a cleat that is similar to any one of the first, second, and third cleats 240, 250, 260, although the cleat adapter 570 shown in the drawings is based on the first cleat 240, as is common on spin bikes. Note that an ordinary cleat adapter without protrusions 572 and 573 would also work with all embodiments described herein, but as will be seen, there are advantages that cleat adapter 570 does not twist out of engagement. For example, it is awkward or even dangerous for an adapter to be stuck on a rider's shoe when they put their foot down on the floor because the bottom of adapters can be slippery and also the rider must bend down low to remove the adapter from their shoe. It is contemplated that protrusions may be added to other adapters, as it would be similarly advantageous if these adapters remained on the pedal when disengaging rather than becoming stuck to the bottom of the rider's shoe. While cleat adapter 570 has a cage on top for use with shoes without cleats, other cleat adapters could be made for adapting to other types of pedal shoe cleats. For example, adapters like those shown in FIGS. 9 and 10 of U.S. Pat. No. 6,877,399, the substance of which is incorporated herein by reference. These other cleat adapters could also be improved by adding protrusions 572 and 573 on cleat adapter 570, so that the cleat adapters cannot inadvertently twist out and yet would easily manually release when used with bicycle pedal 550. All the latches in all the embodiments described herein could have an extension 562 to make manual disengagement possible.

Figure 61:
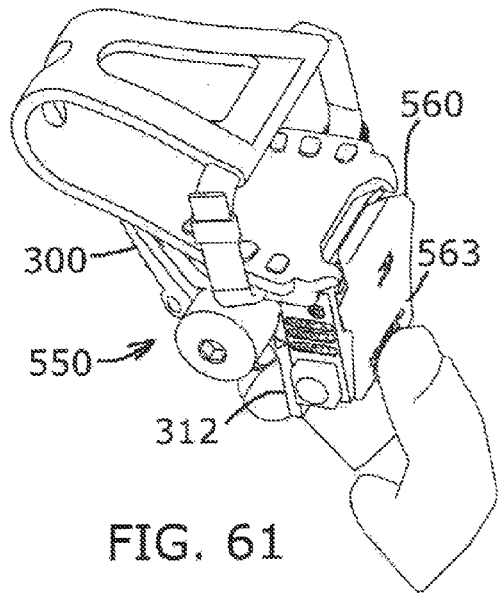
FIG. 61 is a perspective view of the shoe cleat adapter being manually disengaged from the fourth embodiment of the bicycle pedal.

FIG. 61 shows a perspective view of cleat adapter 570 being disengaged from bicycle pedal 550. By, for example, squeezing surface 563 with a thumb and surface 312 of body 300 with a finger, cleat adapter 570 can be easily removed or installed. Note that cleat adapter 570 can be installed either as described, or by pushing down and into bicycle pedal 550.

Figure 62:
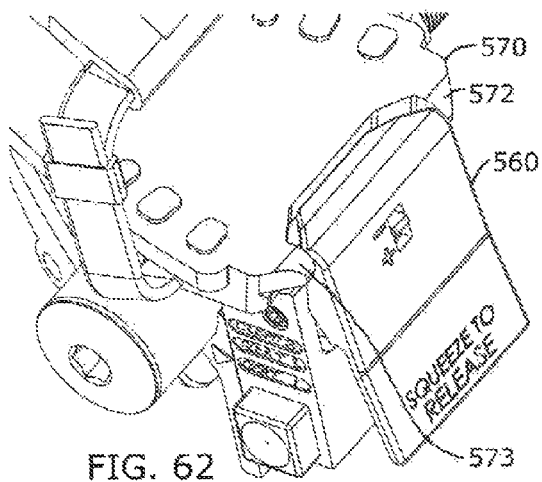
FIG. 62 is a partial, enlarged perspective view of the shoe cleat adapter engaged with the fourth embodiment of the bicycle pedal.
Figure 63:
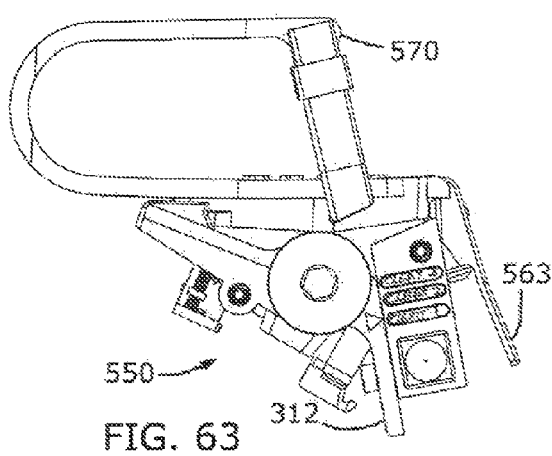
FIG. 63 is a side view of the shoe cleat adapter engaged with the fourth embodiment of the bicycle pedal.
Figure 64:
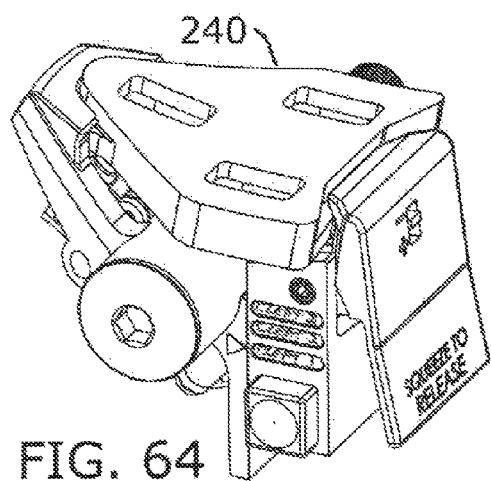
FIG. 64 is a perspective view of the fourth embodiment of the bicycle pedal with the first cleat engaged therewith.
Figure 65:
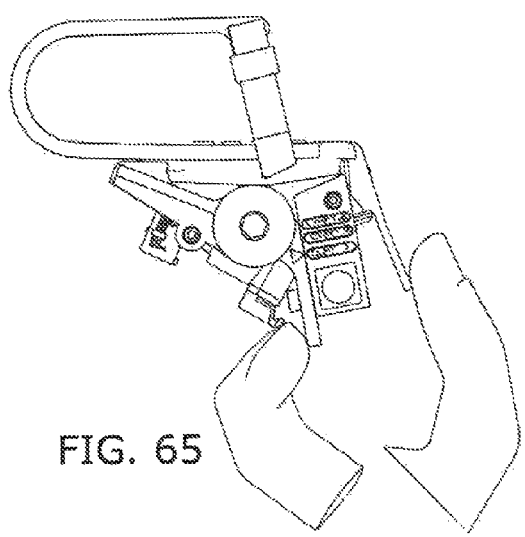
FIGS. 65-68 are sequential, side views illustrating manual release of the shoe cleat adapter from the bicycle pedal.

FIG. 62 shows an enlarged perspective view of bicycle pedal 550 with cleat adapter 570 installed. FIG. 63 is a side view of bicycle pedal 550 with cleat adapter 570 installed. FIG. 64 is a perspective view of bicycle pedal 550 with a first cleat 240 installed. By adjusting the position, second cleat 250 and third cleat 260 would similarly fit as in all the other embodiments. FIG. 65 is a side view with cleat adapter 570 installed into bicycle pedal 550 and ready to be disengaged.

Figure 66:
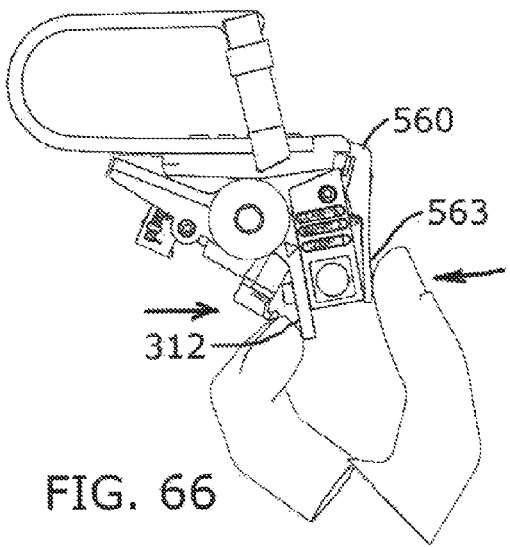

FIG. 66 is a side view of cleat adapter 570 being disengaged by a sideways squeezing surface 563 towards surface 312. Note that this squeezing requires only one hand and is significantly easier than pushing down on the spar on conventional pedals. Pushing down on a conventional spar typically causes a conventional pedal to rotate about the axle which would make the operation two handed in order to prevent rotation, and likely result in the cleat adapter unexpectedly popping out of the pedal. Also, the latch configuration of bicycle pedal 550 is more compact, less vulnerable to damage, and easier to understand than conventional spar systems. By turning bicycle pedal 550 upside down, squeezing as shown would allow the adapter 570 to literally fall into the user's other hand.

Figure 67:
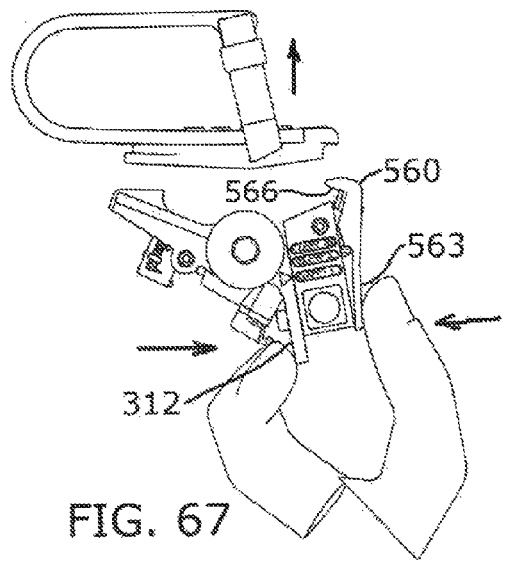
Figure 68:
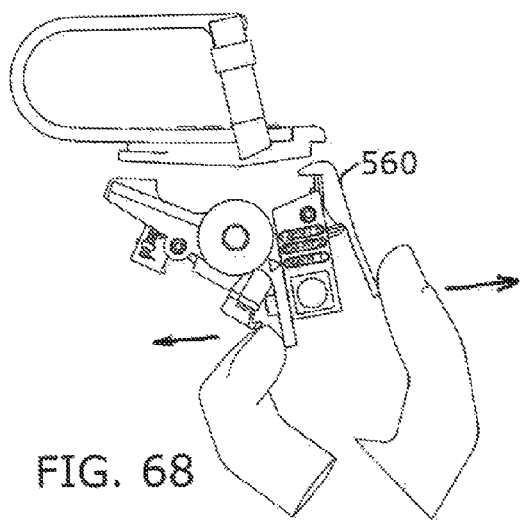
Figure 69:
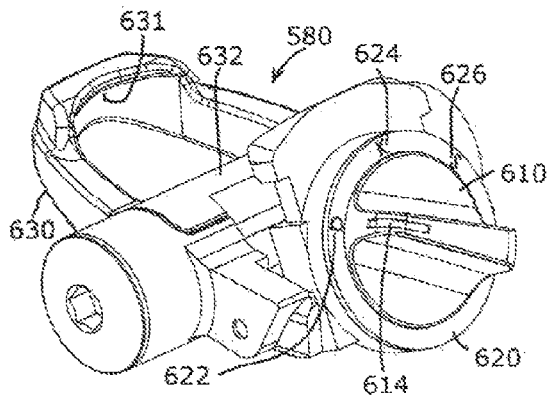
FIG. 69 is an upper perspective view of a fifth embodiment of a bicycle pedal.

FIG. 67 is like FIG. 66 except cleat adapter 570 has been removed after surface 563 has been manually squeezed toward surface 312. The bicycle pedal 550 is adapted for use with a road type shoe cleat 240, 250, 260, and adapter 570 to engage with three areas of contact comprising a front hook 301, a cleat contact surface 302, and the spring biased rear hook 566, and wherein the position of the areas of contact relative to each other is adjustable in order to accommodate the different cleats 240, 250, 260, and adapter 570. Bicycle pedal 550 uses a sliding mechanism for adjusting the position of the three areas of contact. Also, like bicycle pedal 280, bicycle pedal 550 accommodates a mountain bike cleat 390 on another side. FIG. 68 is similar to FIG. 67 except latch 560 has been released.

Referring now to FIGS. 69-73 there is depicted a fifth embodiment of bicycle pedal 580. Generally, bicycle pedal 580 is similar to bicycle pedal 10 except the method of adjusting the height of latch 590 differs from latch 180. Bicycle pedals 10 and 580 both include sliding adjustments, although bicycle pedal 580 is specifically configured to enable user control of the height/position of latch 590 by the rotational position of knob 610. When indicator 614 is pointed towards first cleat indicator 622 as shown, then bicycle pedal 580 is ready to accept a first cleat 240.

Figure 70:
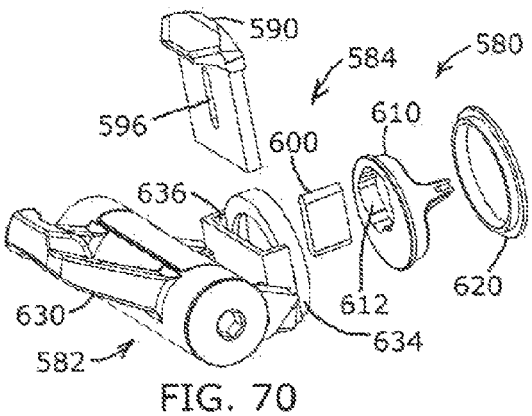
FIG. 70 is a perspective, partial exploded view of the bicycle pedal of FIG. 69.

FIG. 70 is a partially exploded view of bicycle pedal 580 to show how the adjustment system works. Bicycle peal 580 is comprised of a body assembly 582 and a latch assembly 584. Latch assembly 584 is comprised of a latch 590, a key 600, a knob 610, and a ring 620. To assembly the latch assembly 584, latch 590 slides into track 636 of body 630, and key 600 fits firmly into slot 596 of latch 590. The knob 610 includes a cam recess 612 specifically sized and configured to fit over the rest of key 600, and ring 620 fits securely into ring 634 of body 630. Ring 620 could be press fit, glued, threaded, or other suitable joining method to ring 634. When knob 610 is rotated, the configuration of cam recess 612 causes the corresponding camming surfaces to interface with the key 600 to move the key 600 in a predicable path, which in turn causes latch 590 to pause in three different precise positions, each being associated with respective ones of the cleats 240, 250, and 260. In this regard, the camming surfaces associated with the cam recess 612, and the key 600 are specifically configured such that rotation of the knob 610 results in translational/axial movement of the latch 590.

Figure 71:
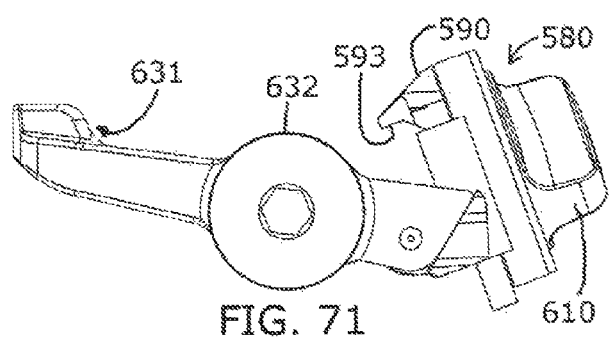
FIG. 71 is a side view of the bicycle pedal of FIG. 69 adjusted to engage with the third cleat.
Figure 72:
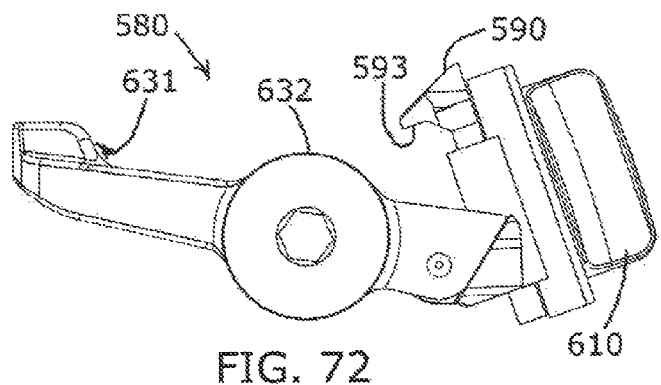
FIG. 72 is a side view of the bicycle pedal of FIG. 69 adjusted to engage with the second cleat.
Figure 73:
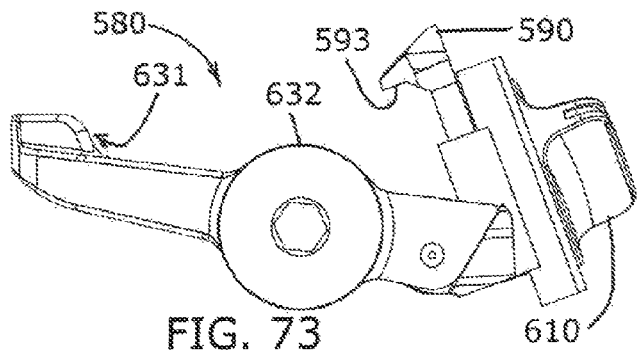
FIG. 73 is a side view of the bicycle pedal of FIG. 69 adjusted to engage with the first cleat.
Figure 74:
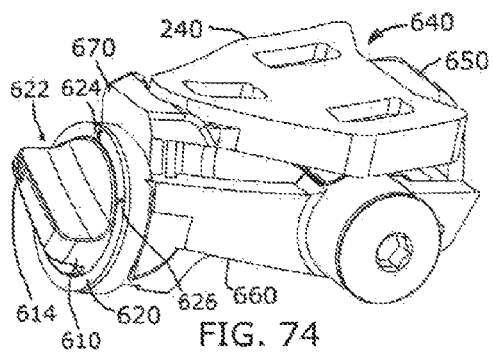
FIG. 74 is an upper perspective view of the bicycle pedal of FIG. 69 with the first cleat engaged therewith.

FIG. 71 is a side view of bicycle pedal 580, ready for a third cleat 260 to be engaged therewith, FIG. 72 is a side view of bicycle pedal 580, ready to receive/engage with a second cleat 250, and FIG. 73 is a side view of bicycle pedal 580, ready to receive/engage with a first cleat 240. The position of knob 610 and the relative position of latch 590 and rear hook 593 varies to adjust the pedal 580 based on the cleat that is to be used with the pedal 580. As with all embodiments, there are three areas of cleat contact, namely a front hook 631 of body 630, surface 632, and rear hook 593 of latch 590, wherein the position of the areas of contact relative to each other is adjustable in order to accommodate the different cleats 240, 250, and 260. Bicycle pedal 580 uses a sliding/translating mechanism for adjusting the position of the three areas of contact, although the sliding is rotationally activated.

Figure 75:
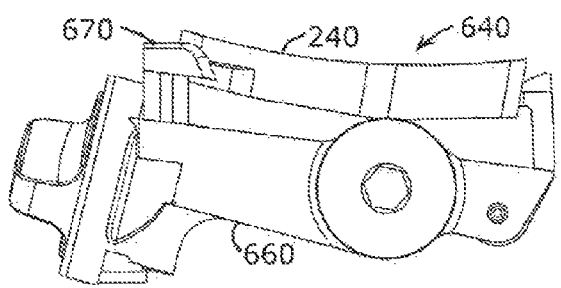
FIG. 75 is a side view of the bicycle pedal and first cleat of FIG. 74.

Referring now to FIGS. 74-78, there is depicted a sixth embodiment of a bicycle pedal 640. Generally, the bicycle pedal 640 is similar to bicycle pedal 580 except a front latch 670 is height/position adjustable instead of a rear latch 590. With bicycle pedal 640, the height of latch 670 is controlled by the rotational position of knob 610, although other adjustment mechanisms known in the art may also be used. When indicator 614 is pointed towards first cleat indicator 622, the bicycle pedal 640 is ready to accept a first cleat 240 as shown. Similar to bicycle pedal 580, when knob 610 is rotated, cam recess 612 causes key 600 to move in a prescribed path to cause latch 590 to pause in three different precise positions suitable for cleats 240, 250, and 260. FIG. 75 is a side view of bicycle pedal 640 with a first cleat 240 installed.

Figure 76:
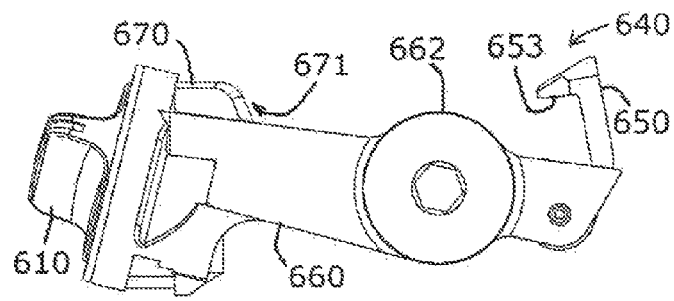
FIG. 76 is a side view of the bicycle pedal of FIG. 69 adjusted for engagement with the third cleat.
Figure 77:
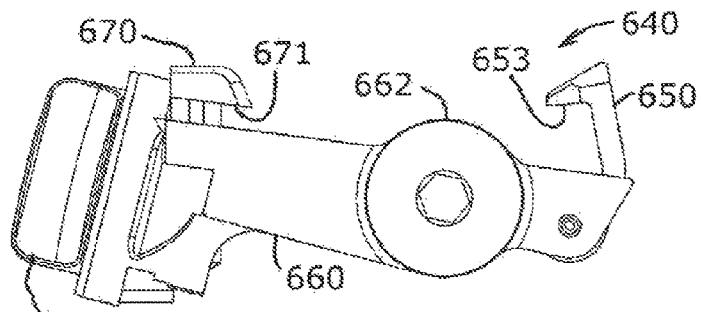
FIG. 77 is a side view of the bicycle pedal of FIG. 69 adjusted for engagement with the second cleat.
Figure 78:
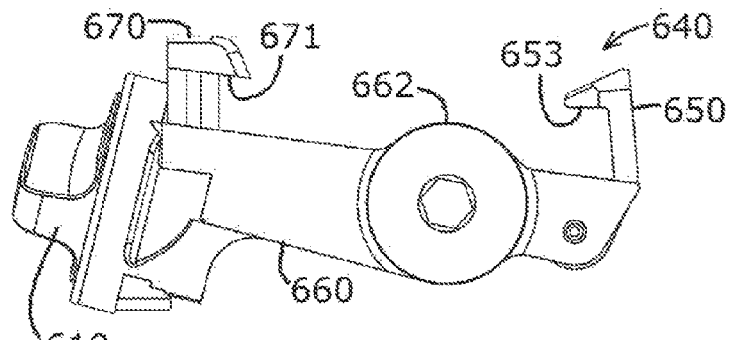
FIG. 78 is a side view of the bicycle pedal of FIG. 69 adjusted for engagement with the first cleat.

FIG. 76 is a side view of bicycle pedal 640, ready for a third cleat 260 to be installed and indicator 614 pointing towards third cleat indicator 626. FIG. 77 is a side view of bicycle pedal 640, ready for a second cleat 250 to be installed and indicator 614 pointing towards the second cleat indicator 624. FIG. 78 is a side view of bicycle pedal 640, ready for a first cleat 240 to be installed and indicator 614 pointing towards first cleat indicator 622. As with all embodiments, there are three areas of cleat contact, namely a front hook 671 of front latch 670, surface 662 of body 660, and spring biased rear hook 653 of latch 650 and wherein the position of the areas of contact relative to each other is adjustable in order to accommodate the different cleats 240, 250, and 260. Bicycle pedal 640 uses a sliding/translating mechanism for adjusting the position of the three areas of contact, although the sliding is rotationally activated.

Referring now to FIGS. 79-86, there is shown a seventh embodiment of a bicycle pedal 680 which uses a rotational mechanism for adjusting the position of the three areas of contact. Any of three different road type shoe cleats 240, 250, and 260 may be used with bicycle pedal 680 and are captured by three areas of contact. In this embodiment, the height/position is fixed for both the front hook 701 and the rear hook 693. In all previously described embodiments, either the front or rear hook height was adjustable. Instead, bicycle pedal 680 has a sleeve 710 that rotates to adjust the surface height to either first cleat contact surface 712, second cleat contact surface 714, or third cleat contact surface 716 associated with the first cleat 240, second cleat 250, or third cleat 260, respectively. In this regard, the separate cleat contact surfaces 712, 714, 716 are associated with discrete regions or areas of the outer surface of the rotating sleeve 710. Bicycle pedal 680 demonstrates that all the cleats 240, 250 and 260 can be accommodated by adjusting any of the three areas of contact.

Figure 79:
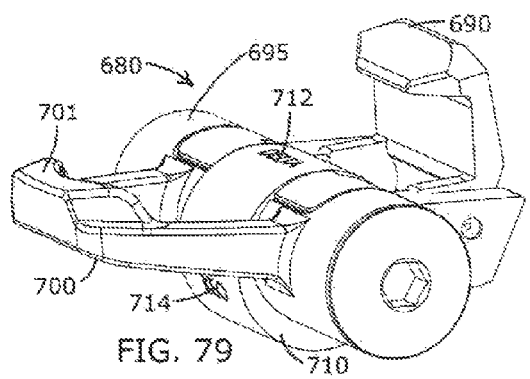
FIG. 79 is an upper perspective view of a seventh embodiment of the bicycle pedal.
Figure 80:
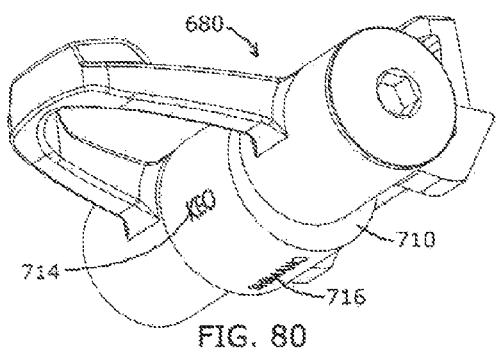
FIG. 80 is a lower perspective view of a seventh embodiment of the bicycle pedal.

FIGS. 79 and 80 show the bicycle pedal 680 with sleeve 710 rotationally positioned relative to the front hook 710 and rear hook 693, such that the first cleat contact surface 712 is in operative alignment with the first hook 701 and rear hook 693, and the second and third cleat contact surfaces 714, 716 are out of operative alignment with the first hook 701 and the rear hook 693. As used herein, a cleat contact surface is in "operative alignment" with the front hook and rear hook when the cleat contact surface is positioned to support a bottom surface of the shoe cleat when the shoe cleat is engaged with the bicycle pedal.

Figure 81:
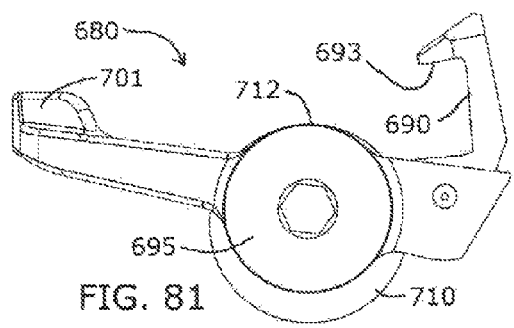
FIG. 81 is a side view of the bicycle pedal of FIG. 79 adjusted for engagement with the first cleat.
Figure 82:
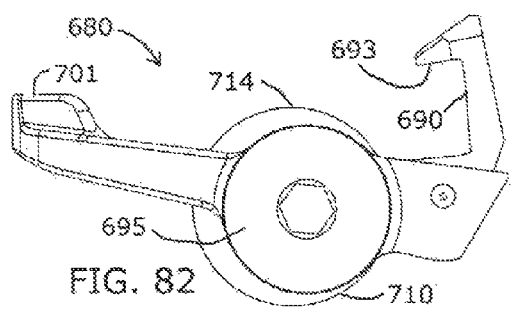
FIG. 82 is a side view of the bicycle pedal of FIG. 79 adjusted for engagement with the second cleat.
Figure 83:
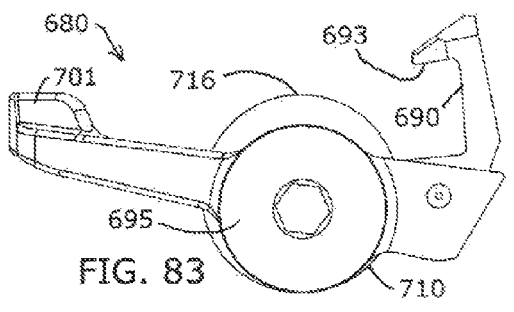
FIG. 83 is a side view of the bicycle pedal of FIG. 79 adjusted for engagement with the third cleat.

FIG. 81 is a side view of bicycle pedal 680, with the sleeve 710 positioned such that the first cleat contact surface 712 is in operative alignment with the front hook 701 and the rear hook 693, such that the pedal 680 is ready to receive a first cleat 240. FIG. 82 is a side view of bicycle pedal 680, with the sleeve 710 positioned such that the second cleat contact surface 714 is in operative alignment with the front hook 701 and the rear hook 693, such that the pedal 680 is ready to receive a second cleat 250. FIG. 83 is a side view of bicycle pedal 680, with the sleeve 710 positioned such that the third cleat contact surface 716 is in operative alignment with the front hook 701 and the rear hook 693, such that the pedal 680 is ready to receive a third cleat 260. In this regard, the sleeve 710 is configured such that as it rotates relative to the front hook 710 and rear hook 693, different cleat contact surfaces are brought into operative alignment with the front hook 710 and rear hook 693, with each cleat contact surface being associated with a different engagement configuration. As such, the pedal 680 may include a base 695 to which the sleeve 710 is rotationally coupled. The sleeve 710 may have an oblong configuration and/or an offset rotational axis relative to the base 695 to create the different cleat contact surface positions shown in FIGS. 81-83.

Figure 84:
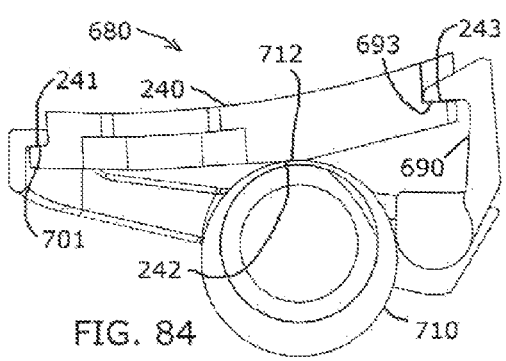
FIG. 84 is a side view of the bicycle pedal of FIG. 79 engaged with the first cleat.

FIG. 84 is a center section of the view shown in FIG. 81. First cleat 240 front lip 241 is captured by body 700 front hook 701, rear lip 243 is captured by latch 690 rear hook 693, and cleat 240 bottom surface 242 is supported by sleeve 710 first cleat contact surface 712. In this way, first cleat 240 is completely engaged and fully supported and stable in all directions except twisting, which is necessary to retain desired rotational "float" and to allow the rider to disengage from the pedal by twisting.

Figure 85:
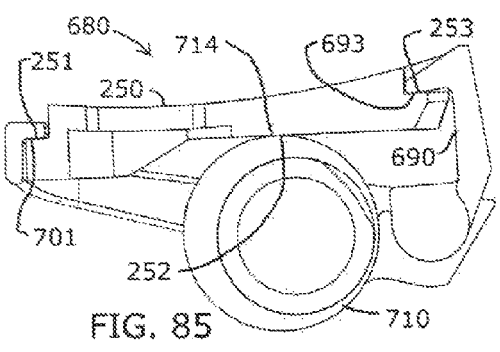
FIG. 85 is a side view of the bicycle pedal of FIG. 79 engaged with the second cleat.

FIG. 85 is a center section of the view shown in FIG. 82. Second cleat 250 front lip 251 is captured by body 700 front hook 701, rear lip 253 is captured by latch 690 rear hook 693, and cleat 250 bottom surface 252 is supported by sleeve 710 second cleat contact surface 714. Sleeve 710 is eccentric such that third surface 716 is higher than second surface 714, which is higher than first surface 712, depending on the rotational position of sleeve 710 relative to body 700. In this way, the three areas of cleat contact are adjusted relative to each other, depending on which cleat (240, 250, 260) is desired to fit.

Figure 86:
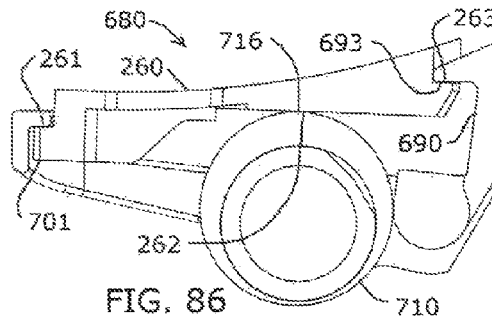
FIG. 86 is a side view of the bicycle pedal of FIG. 79 engaged with the third cleat.

FIG. 86 is a center section of the view shown in FIG. 83. Third cleat 260 front lip 261 is captured by body 700 front hook 701, rear lip 243 is captured by latch 690 rear hook 693, and cleat 260 bottom surface 262 is supported by sleeve 710 third cleat contact surface 716.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A bicycle pedal adapted for use with at least a first shoe cleat having a first cleat configuration and a second shoe cleat having a second cleat configuration different from the first cleat configuration, the bicycle pedal comprising:
 a base;
 a front hook engageable with a first portion of a particular shoe cleat, the particular shoe cleat being one of the first shoe cleat and the second shoe cleat;
 a cleat contact surface coupled to the front hook and engageable with a second portion of the particular shoe cleat;
 a rear hook coupled to the cleat contact surface and engageable with a third portion of the particular shoe cleat; and
 a locking mechanism coupled to the base and at least one of the front hook, the cleat contact surface, and the rear hook;
 the front hook, the cleat contact surface, and the rear hook being selectively transitional between at least two different engagement configurations including:
  a first engagement configuration, wherein the first hook, the cleat contact surface, and the rear hook are positioned so as to be complimentary to the first cleat configuration; and
  a second engagement configuration, wherein the first hook, the cleat contact surface, and the rear hook are positioned so as to be complimentary to the second cleat configuration;
 at least one of the front hook, the cleat contact surface, and the rear hook being moveable relative to the base and the remaining ones of the front hook, the cleat contact surface and the rear hook to facilitate transition between the first engagement configuration and the second engagement configuration;
 the locking mechanism restricting movement of at least one of the front hook, the cleat contact surface, and the rear hook relative to the base when the front hook, the cleat contact surface, and the rear hook is transitioned to one of the first engagement configuration and the second engagement configuration.

2. The bicycle pedal as recited in claim 1, wherein at least one of the front hook, the cleat contact surface, and the rear hook is slidable relative to the base to facilitate transition between the first engagement configuration and the second engagement configuration.

3. The bicycle pedal as recited in claim 1, wherein at least one of the front hook, the cleat contact surface, and the rear hook is rotatable relative to the base to facilitate transition between the first engagement configuration and the second engagement configuration.

4. The bicycle pedal according to claim 1, wherein the locking mechanism is transitional between an unlocked configuration to enable movement between the at least one of the front hook, the cleat contact surface, and the rear hook, and the base, and a locked configuration to restrict movement between the at least one of the front hook, the cleat contact surface, and the rear hook, and the base, the locking mechanism being spring biased toward the locked configuration.

5. The bicycle pedal according to claim 4, wherein:
 the base includes a first locking slot and a second locking slot; and
 the locking mechanism includes a tab selectively insertable into the first locking slot and the second locking slot;
 the front hook, the cleat contact surface, and the rear hook assuming the first engagement configuration when the tab is inserted in the first locking slot;
 the front hook, the cleat contact surface, and the rear hook assuming the second engagement configuration when the tab is inserted in the second locking slot.

6. The bicycle pedal according to claim 1, wherein the base includes having a first side and an opposing second side, the front hook, the cleat contact surface, and the rear hook being coupled to the first side of the base the bicycle pedal further comprising:
 an engagement mechanism coupled to the second side of the base and being selectively engageable with a third shoe cleat different from the first shoe cleat and second shoe cleat.

7. The bicycle pedal according to claim 1, the base being pivotally coupled to the rear hook, and the rear hook including an extension arm adapted to enable manual pivotal adjustment of the rear hook relative to the base to effectuate release of the cleat from the bicycle pedal.

8. A bicycle pedal for use with a shoe cleat, the bicycle pedal comprising:
 a base;
 a plurality of contact regions coupled to the base, the plurality of contact regions including:
  a front hook for receiving a front lip of the shoe cleat;
  a pivotable rear hook for receiving a rear lip of said shoe cleat; and
  a top surface extending along said base for supporting a bottom surface of the shoe cleat;
  the plurality of contact regions being positioned relative to each other to collectively define an engagement configuration;
  one of the plurality of contact regions defining an adjustable region and being adjustable relative to the remaining ones of the plurality of contact regions to transition the engagement configuration from a first engagement configuration associated with a first shoe cleat and a second engagement configuration associated with a second shoe cleat; and
 a locking mechanism coupled to the adjustable region and the base, the locking mechanism being configured to restrict movement of the adjustable region relative to the base when the adjustable region is located in a defined position.

9. The bicycle pedal according to claim 8, wherein the adjustable region is translatable relative to the remaining ones of the plurality of contact regions.

10. The bicycle pedal according to claim 8, wherein the adjustable region is rotatable relative to the remaining ones of the plurality of contact regions.

11. The bicycle pedal according to claim 8, further comprising an engagement mechanism coupled to the base in opposed relation to the plurality of contact regions and being selectively engageable with a shoe cleat.

12. The bicycle pedal according to claim 8, wherein the rear hook includes an extension arm adapted to enable manual pivotal adjustment of the rear hook relative to the base.

13. The bicycle pedal according to claim 8, wherein:
 the base includes a first locking slot and a second locking slot; and
 the locking mechanism includes a tab selectively insertable into the first locking slot and the second locking slot;

the plurality of contact regions assuming the first engagement configuration when the tab is inserted in the first locking slot;
the plurality of contact regions assuming the second engagement configuration when the tab is inserted in the second locking slot.

\* \* \* \* \*